United States Patent
Yerushalmi et al.

(10) Patent No.: US 10,951,523 B2
(45) Date of Patent: Mar. 16, 2021

(54) PORT EXTENDER WITH LOCAL SWITCHING

(71) Applicant: Marvell World Trade Ltd., St. Michael (BB)

(72) Inventors: Ilan Yerushalmi, Hod Hasharon (IL); David Melman, Halutz (IL); Tal Mizrahi, Haifa (IL); Donald Pannell, Cupertino, CA (US)

(73) Assignee: Marvell Asia Pte, Ltd., Singapore (SG)

(*) Notice: Subject to any disclaimer, the term of this patent is extended or adjusted under 35 U.S.C. 154(b) by 11 days.

(21) Appl. No.: 15/866,216

(22) Filed: Jan. 9, 2018

(65) Prior Publication Data
US 2018/0198720 A1 Jul. 12, 2018

Related U.S. Application Data

(60) Provisional application No. 62/443,950, filed on Jan. 9, 2017.

(51) Int. Cl.
*H04L 12/18* (2006.01)
*H04L 12/46* (2006.01)
(Continued)

(52) U.S. Cl.
CPC ............ *H04L 45/745* (2013.01); *H04L 12/18* (2013.01); *H04L 45/586* (2013.01);
(Continued)

(58) Field of Classification Search
None
See application file for complete search history.

(56) References Cited

U.S. PATENT DOCUMENTS 6,980,547 B1 * 12/2005 Gally ................. H04L 49/351
370/389
7,016,352 B1    3/2006 Chow et al.
(Continued)

FOREIGN PATENT DOCUMENTS

EP      0960536 B1    8/2003
EP     1 885 139 A1   2/2008
(Continued)

OTHER PUBLICATIONS

International Search Report and Written Opinion in International Patent Application No. PCT/US2018/012951, dated May 28, 2018 (14 pages).
(Continued)

*Primary Examiner* — Sai Aung
*Assistant Examiner* — Liem H. Nguyen

(57) ABSTRACT

A switching system comprises a controlling switch and a plurality of port extenders. One of the port extenders includes: at least one upstream port; multiple downstream ports; and a forwarding engine. A forwarding database is populated with entries indicating associations between i) respective network addresses corresponding to devices coupled to downstream ports, and ii) respective local downstream ports. The forwarding database excludes entries corresponding to network addresses corresponding to devices coupled to the at least one upstream port. The forwarding engine is configured to: for a first packet received via one of the local downstream ports, and having a destination network address in the forwarding database, forward the first packet to a different local downstream port indicated by the forwarding database. For a second packet received via one of the local downstream ports, and having a destination network address not in the forwarding data- (Continued)

base, forward the second packet to the at least one upstream port.

22 Claims, 6 Drawing Sheets

(51) Int. Cl.
| | |
|---|---|
| *H04L 12/713* | (2013.01) |
| *H04L 12/721* | (2013.01) |
| *H04L 12/741* | (2013.01) |
| *H04L 12/851* | (2013.01) |
| *H04L 12/931* | (2013.01) |
| *H04L 12/933* | (2013.01) |

(52) U.S. Cl.
CPC ........ *H04L 47/2441* (2013.01); *H04L 49/109* (2013.01); *H04L 49/70* (2013.01); *H04L 12/4645* (2013.01); *H04L 45/66* (2013.01); *H04L 49/35* (2013.01)

(56) References Cited

U.S. PATENT DOCUMENTS

| | | | |
|---|---|---|---|
| 7,215,637 | B1 | 5/2007 | Ferguson et al. |
| 8,625,594 | B2 | 1/2014 | Safrai et al. |
| 8,804,733 | B1 | 8/2014 | Safrai et al. |
| 9,042,405 | B1 | 5/2015 | Safrai |
| 9,172,603 | B2 | 10/2015 | Padmanabhan et al. |
| 9,258,219 | B1 | 2/2016 | Safrai et al. |
| 9,319,317 | B1* | 4/2016 | Spadaro ................ H04L 45/745 |
| 2002/0046271 | A1* | 4/2002 | Huang .................... H04L 45/28 709/223 |
| 2002/0085585 | A1* | 7/2002 | Tzeng ..................... H04L 49/90 370/475 |
| 2008/0031260 | A1* | 2/2008 | Polland ................. H04L 45/502 370/395.53 |
| 2008/0049612 | A1* | 2/2008 | Oelgaard ................ H04L 47/10 370/229 |
| 2009/0245137 | A1* | 10/2009 | Hares ..................... H04L 41/30 370/254 |
| 2010/0034081 | A1* | 2/2010 | Yoshimura .......... H04L 12/6402 370/228 |
| 2010/0316053 | A1* | 12/2010 | Miyoshi .................. H04L 45/00 370/392 |
| 2011/0299413 | A1* | 12/2011 | Chatwani ............ H04L 12/4633 370/252 |
| 2012/0287930 | A1 | 11/2012 | Raman |
| 2013/0058215 | A1 | 3/2013 | Koponen et al. |
| 2013/0223449 | A1* | 8/2013 | Koganti .................. H04L 49/10 370/392 |
| 2014/0269710 | A1* | 9/2014 | Sundaram ............. H04L 45/302 370/392 |
| 2015/0188808 | A1* | 7/2015 | Ghanwani ............... H04L 45/48 709/244 |
| 2016/0056995 | A1* | 2/2016 | Kariya ................ H04L 41/0654 370/226 |
| 2017/0339062 | A1 | 11/2017 | Mayer-Wolf et al. |

FOREIGN PATENT DOCUMENTS

| | | |
|---|---|---|
| EP | 2911352 A2 | 8/2015 |
| WO | WO-2013/082407 A1 | 6/2013 |

OTHER PUBLICATIONS

Pelissier, "Introduction to Port Extension," *21st International Teletraffic Congress (ITC 21)*, pp. 1-9 (Sep. 14, 2009).
IEEE Std 802.1Q, 2003 Edition, "IEEE Standards for Local and Metropolitan area networks—Virtual Bridged Local Area Networks," The Institute of Electrical and Electronics Engineers, Inc., 327 pages (May 7, 2003).
IEEE Std 802.1Q—2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).
IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," The Institute of Electrical and Electronics Engineers, Inc., 363 pages (Feb. 10, 2012).
IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).
IEEE Std 802.1Q™—2014 (Revision of IEEE Std.802.1 Q-2011), "IEEE Standard for Local and Metropolitan Area Networks—Bridges and Bridged Networks," The Institute of Electrical and Electronics Engineers, Inc., 1,832 pages (Nov. 3, 2014).
IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," The Institute of Electrical and Electronics Engineers, Inc., 379 pages (Mar. 8, 2002).
EEE Std 802.3-2005, "IEEE Standard for Information technology—Telecommunications and information exchange between systems—Local and metropolitan area networks Specific requirements, Part 3: Carrier sense multiple access with collision detection (CSMA/CD) access method and physical layer specifications," The Institute of Electrical and Electronics Engineers, Inc., Sections 1-5, 2695 pages (Dec. 9, 2005).
IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation the Institute of Electrical and Electronics Engineers, Inc., 540 pages (May 1, 2002).
Chen, "Home Network Basis: Transmission Environments and Wired/Wireless Protocols," Prentice Hall, 26 pages (2006).
IEEE Std 802.1Qau, Amendment to IEEE Std 802 1Q-2005,"Virtual Bridged Local Area Networks—Amendment 13: Congestion Notification" The Institute of Electrical and Electronics Engineers, Inc., 135 pages, Apr. 2010.
IEEE Std 802.3-2005 (revision), "IEEE Standard for Information technology—Telecommunications and information exchange between systems—Local and metropolitan area networks—Specific requirements, Part 3: Carrier Sense Multiple Access with Collision Detection (CSMA/CD) access method and physical layer specifications," The Institute of Electrical and Electronics Engineers, Inc., 417 pages (2005).
IEEE Std 802.1 Br-2012 "IEEE Standard for Local and metropolitan area networks—Virtual Bridged Local Area Networks—Bridge Port Extension," The Institute of Electrical and Electronics Engineers, Inc., 135 pages (May 14, 2012).
Office Action in U.S. Appl. No. 15/878,961, dated Feb. 19, 2019 (37 pages).
U.S. Appl. No. 15/878,961, Yerushalmi et al., "Port Extender with Local Switching," filed Jan. 24, 2018.
International Preliminary Report on Patentability in International Patent Application No. PCT/US2018/012951, dated Jul. 18, 2019 (10 pages).
Notice of Allowance in U.S. Appl. No. 15/878,961, dated Jun. 27, 2019 (21 pages).

\* cited by examiner

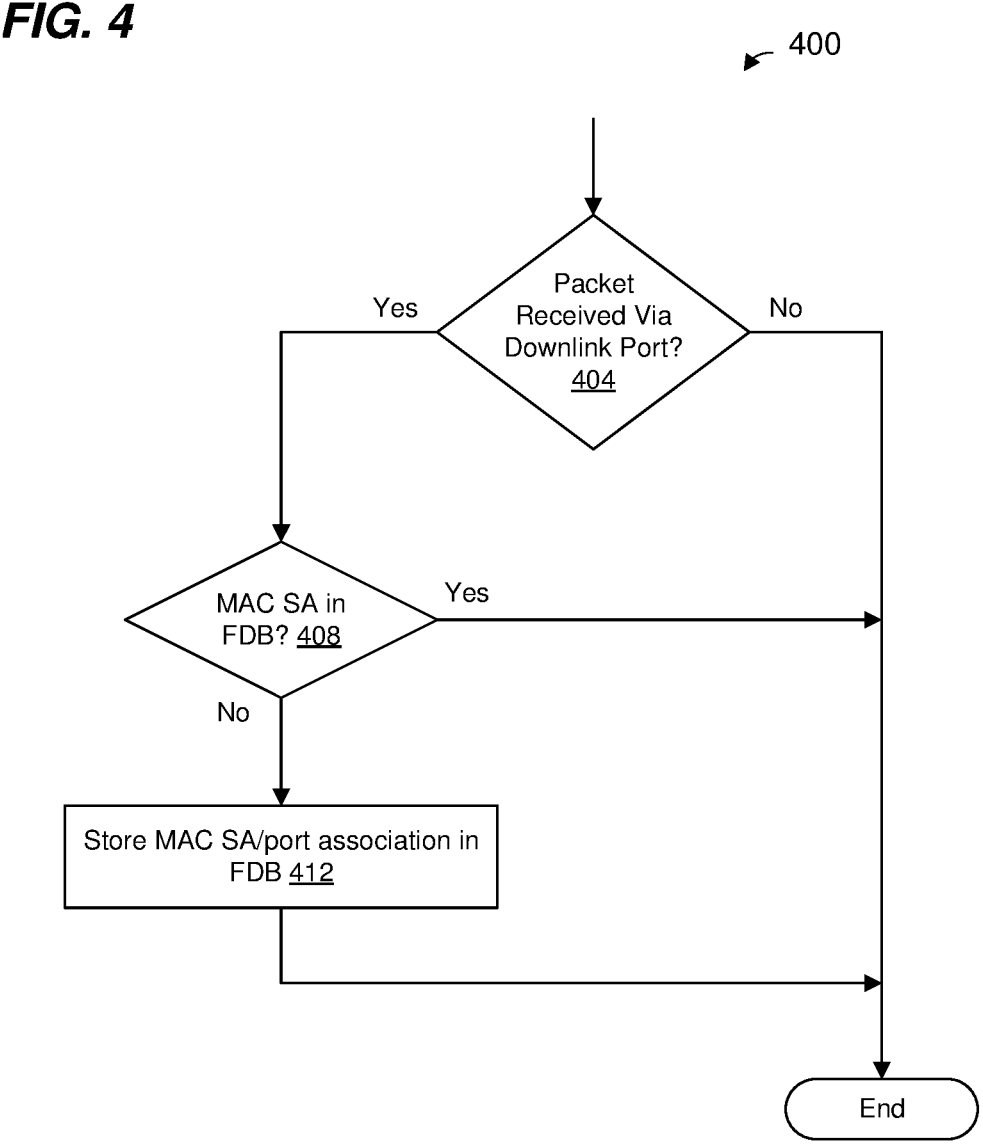

PORT EXTENDER WITH LOCAL SWITCHING

CROSS REFERENCES TO RELATED APPLICATIONS

This application claims the benefit of U.S. Provisional Patent App. No. 62/443,950, entitled "Port Extender with Local Switching," filed on Jan. 9, 2017, the disclosure of which is hereby expressly incorporated herein by reference in its entirety.

FIELD OF TECHNOLOGY

The present disclosure relates generally to network switching systems, and more particularly to network switching systems that use port extenders.

BACKGROUND

Some networking applications require switching between high numbers of ports. For example, a typical data center includes a large number of servers, and switches configured to communicatively couple the servers to outside network connections, such as backbone network links. As another example, a high-volume website server system (server farm) can include a large number of web servers, and switches to communicatively couple the web servers to backbone network links. More generally, enterprise networks involve large numbers of computers communicatively coupled together via large numbers of network links, which often require switching systems that switch between large numbers of ports.

In such applications, switching systems capable of switching between a large number of ports are utilized. Such switching systems can include a large number of switches, and each switch can be capable of switching between several ports.

Some network switching systems utilize port extenders (PEs) coupled to a controlling bridge. Each PE includes a plurality of ports, and is a low complexity device that requires direction from the controlling bridge. Thus, when coupled to a port of the controlling bridge, the PE effectively increases the number of ports handled by the controlling bridge at relatively low cost.

When a packet ingresses a network switching system employing PEs, i.e., the packet ingresses a port of a source PE (a "source extended port"), the PE adds a tag to the packet, records in the tag the source extended port on which the packet was received, and then forwards the packet to the controlling bridge. The controlling bridge processes the packet (including the tag), determines a target extended port via which the packet is to be transmitted from the network switching system, and records the target extended port in the tag of the packet. The controlling bridge then forwards the packet to the target PE (which includes the target extended port). The target PE processes the tag of the packet to determine the extended port via which the packet is to be transmitted, and sends the packet to the target extended port. The target PE strips the tag from the packet prior to transmitting the packet.

The Institute for Electrical and Electronics Engineers (IEEE) 802.1BR Standard defines interactions between PEs and a controlling bridge and the content of tags utilized by PEs and the controlling bridge, as discussed above.

SUMMARY

In an embodiment, a port extender is for use in a switching system comprising a controlling switch and one or more other port extenders. The port extender comprises: at least one local upstream port coupled to the controlling switch directly or via another port extender; a plurality of local downstream ports; and a forwarding engine coupled to the at least one local upstream port and the plurality of local downstream ports, the forwarding engine including, or being coupled to, a forwarding database that is populated with entries indicating associations between i) respective network addresses corresponding to devices coupled to local downstream ports of the port extender a) directly or b) via one or more other port extenders downstream from the port extender, and ii) respective local downstream ports of the port extender, wherein the forwarding database excludes entries corresponding to network addresses corresponding to devices coupled directly, or via another port extender upstream from the port extender, to the at least one local upstream port of the port extender. The forwarding engine is configured to: for a first packet i) received via one of the local downstream ports, and ii) having a destination network address in the forwarding database, forward the first packet to a different local downstream port indicated by the forwarding database, and for a second packet i) received via one of the local downstream ports, and ii) having a destination network address not in the forwarding database, forward the second packet to the at least one local upstream port.

In another embodiment, a method is implemented in a port extender in a switching system that includes a controlling switch and one or more other port extenders. The method includes: receiving packets via at least one local upstream port of the port extender, the at least one upstream port being coupled to the controlling switch directly or via an intermediate port extender; receiving packets via a plurality of local downstream ports of the port extender; for packets received via the plurality of downstream ports, search a forwarding database that is populated with entries indicating associations between i) respective network addresses corresponding to devices coupled to local downstream ports of the port extender a) directly or b) via one or more other port extenders downstream from the port extender, and ii) respective local downstream ports of the port extender, wherein the forwarding database excludes entries corresponding to network addresses corresponding to devices coupled directly, or via another port extender upstream from the port extender, to the at least one local upstream port of the port extender; for a first packet i) received via one of the local downstream ports, and ii) having a destination network address in the forwarding database, forwarding the first packet to a different local downstream port indicated by the forwarding database; and for a second packet i) received via one of the local downstream ports, and ii) having destination network addresses not in the forwarding database, forwarding the second packet to the at least one local upstream port.

In yet another embodiment, a switching system, comprises: a controlling switch that includes: a plurality of controlling switch ports, and a first packet processor coupled to the controlling switch ports, the first packet processor including a first forwarding engine that includes, or is coupled to, a first forwarding database, wherein the first forwarding engine is configured to forward packets received at any controlling switch port to any other controlling switch port. The system also comprises: a plurality of port extenders, each of at least some of the port extenders including: at least one local upstream port coupled to the controlling switch directly or via another port extender, a plurality of local downstream ports, and a second packet processor coupled to the at least one local upstream port and the plurality of local downstream ports, the second packet processor including a second forwarding engine that includes, or is coupled to, a second forwarding database. The second forwarding engine is configured to forward packets i) received at the downstream ports, and ii) for which the second forwarding database does not include forwarding information, only to the at least one upstream port. The second packet processors have reduced functionality as compared to the first packet processor.

In still another embodiment, a method is implemented in a switching system that includes a controlling switch and a plurality of port extenders that are coupled to the controlling switch. The method includes: receiving packets via a plurality of local downstream ports of the plurality of port extenders; at each of at least some first packet processors disposed in at least some of the port extenders, performing a first set of packet processing functions, including: directing packets received from a port of the controlling switch to ports of the port extender according to forwarding decisions of the controlling switch, and rendering forwarding decisions for first packets received via the plurality of downstream ports to forward selected first packets to other downstream ports of the port extender if the destination addresses of the selected first packets are included in a forwarding database of the first packet processor of the port extender, and to forward selected second packets to a port of the controlling switch if the destination addresses of the selected second packets are not known to the port extender. The method also includes: at a second packet processor disposed in the controlling switch, performing a second set of packet processing functions, including: forwarding packets received at any controlling switch port to any other controlling switch port.

BRIEF DESCRIPTION OF THE DRAWINGS

FIG. 4 is a flow diagram of an example method for updating a forwarding database in a network device having downstream ports and an upstream port such as a PE, according to an embodiment.

DETAILED DESCRIPTION

In a standard network switching system that uses port extenders (PEs), the PEs are not capable of making local switching decisions without instruction from a controlling switch. Thus, all packets received by PEs from external network connections are forwarded to the controlling switch. In embodiments described below, however, PEs are provided limited local switching capability. In such embodiments, when a PE is able to make a switching decisional locally, the PE does not forward the packet to the controlling bridge but rather sends the packet to a local downstream port of the PE in accordance with the switching decision. Thus, in such embodiments, the number of packets sent to the controlling switch is reduced, which improves performance by reducing overall latency within the switching system and reducing the amount of traffic between PEs and the controlling bridge.

Figure 1A:
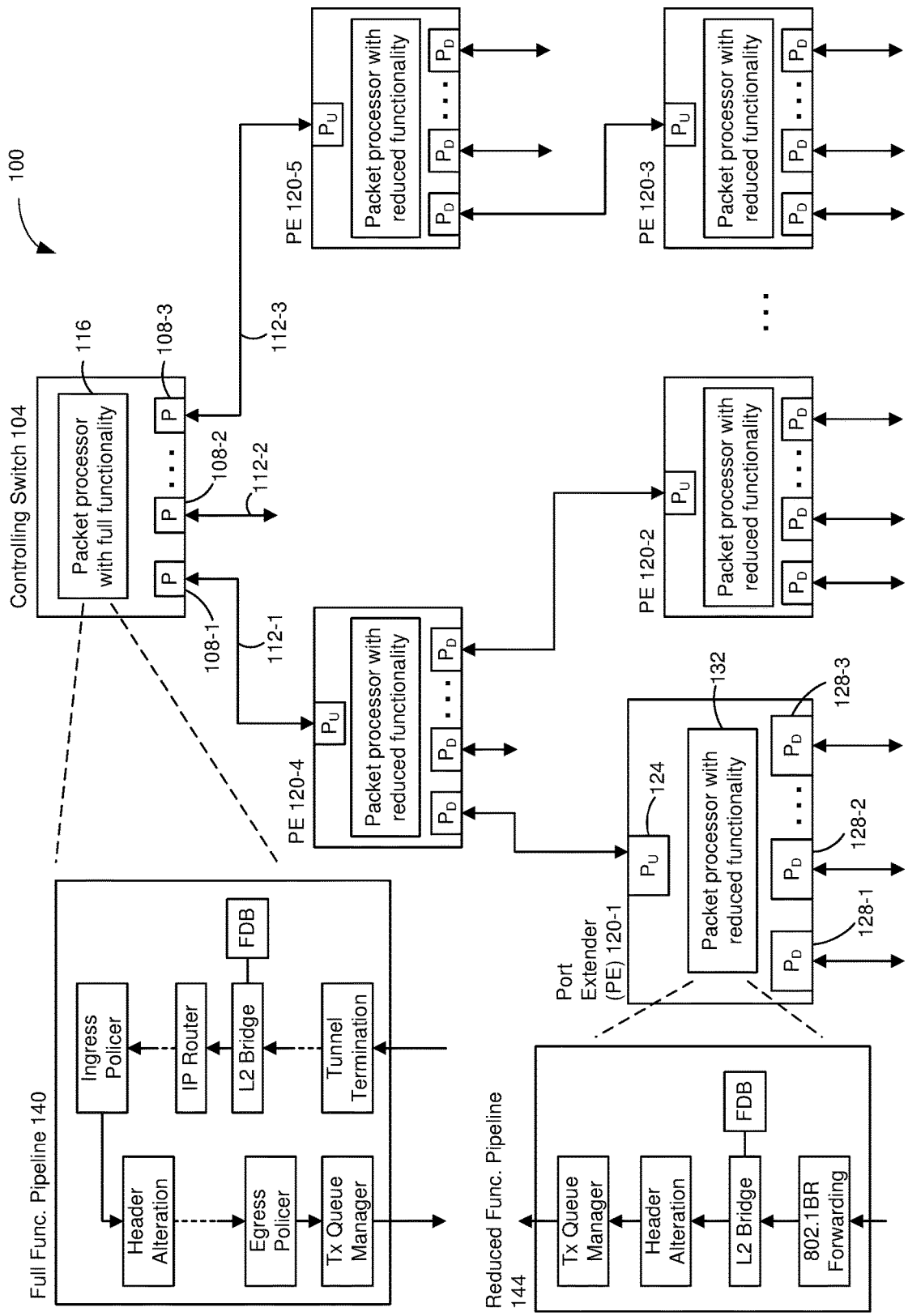
FIG. 1A is a block diagram of an example switching system that includes a controlling switch and a plurality of port extenders (PEs), according to an embodiment.

FIG. 1A is a block diagram of an example network switching system 100 configured for processing and forwarding data units, i.e., packets, according to an embodiment. The switching system 100 includes a controlling switch 104 having a plurality of ports 108 coupled to respective network links 112. The controlling switch 104 includes a packet processor 116, which processes packets ingressing the controlling switch 104 via the ports 108, including making forwarding decisions (i.e., for egress via ports 108). Other functions performed by the packet processor 116 include one or more of, determining whether a packet should be trapped or mirrored to another processor (not shown) for further analysis, determining whether a packet should be discarded, metering, policing, etc. The packet processor 116 will be described in more detail below.

The network switching system 100 also includes a plurality of PEs 120 communicatively coupled to the ports 108 of the controlling switch 104. Each of the PEs 120 has a structure the same as, or similar to, the PE 120-1, and thus all of the PEs 120 are not described in detail for illustrative purposes.

The PE 120-1 includes a plurality of ports including an upstream port 124 and a plurality of downstream ports 128. The upstream port 124 is coupled to a port 108 of the controlling switch 104 either directly or via one or more other PEs 120. In other words, the upstream port 124 is for communicatively coupling directly to i) a port 108 of the controlling switch 104 or ii) a downstream port of another PE (e.g., the PE 120-4) which is disposed between the PE 120 and the controlling switch 104. Although only one upstream port 124 is illustrated in FIG. 1A, in other embodiments the PE 120-1 includes multiple upstream ports 124. For example, different upstream ports 124 are respectively coupled to different network devices in the network switching system 100 (e.g., a first uplink port 124 is coupled to the controlling switch 104, and a second uplink port 124 is coupled to a downlink port of another PE 120; or a first uplink port 124 is coupled to a downlink port of a first other PE 120, and a second uplink port 124 is coupled to a downlink port of a second other PE 120; etc.), according to an embodiment. As another example, multiple upstream ports 124 are respectively coupled to different ports 108 of the controlling switch 104, according to an embodiment. The multiple upstream ports 124 may be organized as a link aggregate group (LAG) (e.g., an upstream LAG) or trunk (e.g., an upstream trunk), according to some embodiments. When the PE 120-1 decides to forward a packet to the upstream LAG or trunk, a particular one of the upstream ports 124 in the upstream LAG or trunk may be selected based on load balancing, for example.

The downstream ports 128 are for communicatively coupling to i) network links that interface with devices external to the network switching system 100, or ii) an upstream port 124 of another PE. For example, in the example of FIG. 1A, all of the downstream ports 128 of the PE 120-1 are coupled to network links that interface with devices external to the network switching system 100. On the other hand, two of the downstream ports of the PE 120-4 are coupled to the upstream port 124 of the PE 120-1 and an upstream port of the PE 120-2.

Downstream ports 128 that are coupled to network links that interface with devices external to the network switching system 100 are sometimes referred to herein as "external-facing ports", whereas downstream ports 128 that are coupled to upstream ports of other PEs are sometimes referred to herein as "cascade ports".

A first PE whose uplink port is coupled directly to a downlink port of a second PE, or whose uplink port is coupled indirectly to a downlink port of a second PE via one or more third PEs is referred to herein as being "downstream from" the second PE. Similarly, a first PE whose downlink port is coupled directly to an uplink port of a second PE, or whose downlink port is coupled indirectly to the uplink port of the second PE via one or more third PEs is referred to herein as being "upstream from" the second PE.

Referring again to the controlling switch 104, the controlling switch 104 includes a packet processor 116 having full functionality, which processes packets ingressing the controlling switch 104 via the ports 108, including making forwarding decisions (i.e., for egress via ports 108). Other functions performed by the packet processor 116 includes one or more of, determining whether a packet should be trapped or mirrored to another processor (not shown) for further analysis, determining whether a packet should be discarded, metering, policing, etc. The packet processor 116 will be described in more detail below.

As illustrated in FIG. 1A, the controlling switch 104 and the PEs 120 are arranged in a hierarchy with the controlling switch 104 at the top of the hierarchy and PE 120-1, PE 120-2, and PE 120-3 at the bottom of the hierarchy. PE 120-4 and PE 120-5 are generally in the middle of the hierarchy, between the controlling switch 104 at the top and PE 120-1, PE 120-2, and PE 120-3 at the bottom.

Packets travelling up the hierarchy (e.g., from the bottom towards the top or in the direction of the controlling switch 104) are sometimes referred to as "upstream packets". For example, packets received at a downstream port 128 of a PE 120, transmitted from an upstream port 124 of a PE 120, or received at a port 108 of the controlling switch 104 are sometimes referred to as "upstream packets". In general, upstream packets are packets for which the network switching system 100 has not yet made a forwarding decision.

Packets travelling down the hierarchy (e.g., from the top towards the bottom or in the direction away from the controlling switch 104) are sometimes referred to as "downstream packets". For example, packets transmitted from a port 108 of the controlling switch 104, received at an upstream port 124 of a PE 120, or transmitted from a downstream port 128 of a PE 120 are sometimes referred to as "downstream packets". In general, downstream packets are packets for which the network switching system 100 has made a forwarding decision.

In an embodiment, the packet processor 116 of the controlling switch 104 and/or the packet processor 132 of the PE 120 uses a pipeline architecture. For example, the packet processor 116 includes a full functionality packet processing pipeline 140 while the packet processor 132 includes a reduced functionality packet processing pipeline 144, according to an embodiment. In other embodiments, however, the packet processor 116 of the controlling switch 104 and/or the packet processor 132 of the PE 120 additionally or alternatively uses a parallel processing architecture in which multiple processors execute machine readable instructions (stored in one or more memory devices coupled to the multiple processors) to process multiple packets in parallel.

The pipeline 140 of the packet processor 116 includes a plurality of pipeline units coupled together in series. Similarly, the pipeline 144 of the packet processor 132 includes a plurality of pipeline units coupled together in series. However, the number of pipeline units in the pipeline 144 is less than the number of pipeline units in the pipeline 140, making the pipeline 144 less complex and thus less expensive to manufacture as compared to the pipeline 140, according to an embodiment. The pipeline 144 is capable of performing a lower number of packet processing functions as compared to the pipeline 140, according to an embodiment. The pipelines 140 and 144 are described in more detail below with reference to FIGS. 1B and 1C.

Figure 1B:
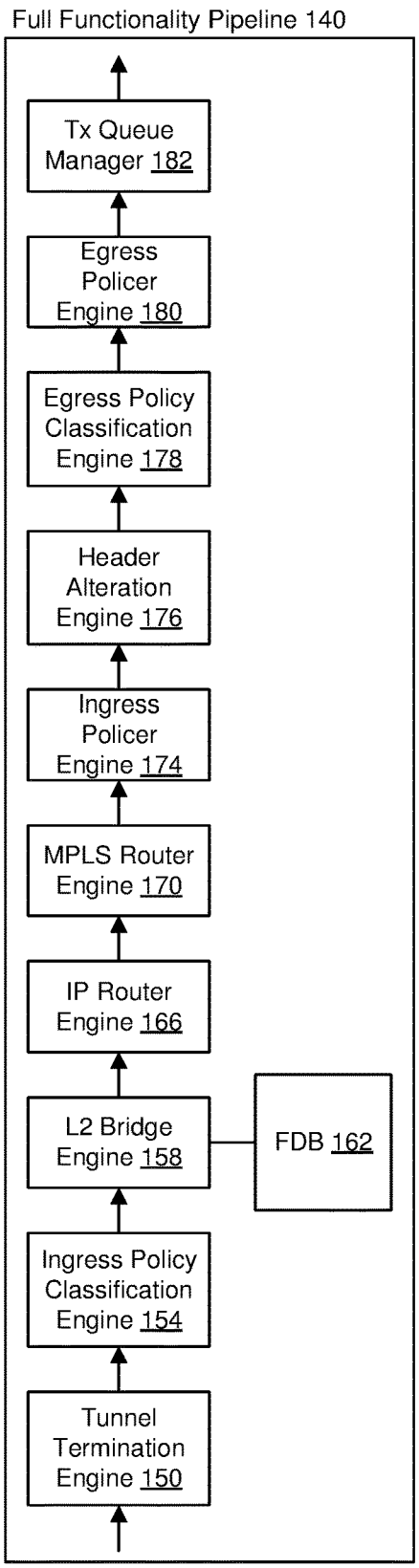
FIG. 1B is a block diagram of an example packet processor pipeline of the controlling switch of FIG. 1A, according to an embodiment.

FIG. 1B is a diagram of an example pipeline 140 of the controlling switch 104, according to an embodiment. As discussed above, the pipeline 140 includes a plurality of pipeline units coupled together in series. Generally, each unit of a pipeline 140 optionally processes a packet descriptor corresponding to the packet and then passes the packet descriptor to the next unit in the pipeline 140. A packet descriptor includes some information from the packet, such as some or all of the header information of the packet, in an embodiment. In some embodiments, the packet descriptor includes other information as well such as an indicator of where the packet is stored in a memory coupled to the packet processor 116. Each unit in the pipeline 140 may or may not process a particular packet descriptor. For example, in some instances, a unit simply passes packet descriptor onto the next unit in the pipeline 140.

In some embodiments, the pipeline 140 includes units not shown in FIG. 1B, and such units are not discussed for purposes of brevity.

A tunnel termination engine 150 performs tunnel termination functions associated with packets transmitted using tunneling protocols. In an embodiment, the tunnel termination engine 150 includes, or is coupled to a lookup table, and the tunnel termination engine 150 performs a lookup in the lookup table using fields of a header of a packet being processed to determine what processing actions should be performed on the packet. For example, for packets transmitted using a tunneling protocol, the tunnel termination engine 150 removes tunneling protocol header fields from the packet (or modifies the packet descriptor to instruct a downstream pipeline unit to remove the tunneling protocol header fields from the packet).

An ingress policy classification engine 154 is coupled to the tunnel termination engine 150. The ingress policy classification engine 154 generally performs flow classification. A flow corresponds to related series of packets, and may be defined in a variety of different suitable ways. One example of a flow is defined by a medium access control protocol (MAC) source address or a particular MAC destination address in a MAC header. In other words, in one example, all packets having a particular MAC source address correspond to a particular flow. Another example of a flow is defined by a MAC source address/destination address pair.

In other words, in one example, all packets having both a particular MAC source address and a MAC destination address correspond to a particular flow. Additionally, fields from different protocol layers may be combined to define a flow, in some embodiments.

For example, the ingress policy classification engine 154 attaches or otherwise associates a flow identifier (ID) to/with a packet descriptor to indicate a flow to which the packet belongs, in an embodiment.

In an embodiment, the ingress policy classification engine 154 includes, or is coupled to, a ternary content addressable memory (TCAM) or other suitable memory. The ingress policy classification engine 154 generally uses fields of the header of the packet being processed, and other information such as the source port, as a key to the TCAM. An entry in the TCAM indicates a particular rule or set of one or more actions to be performed (with regard to flow measurement, VLAN assignment, target port assignment, etc., for example). In some scenarios, at least some of the actions to be performed are to be performed by processing units downstream from the ingress policy classification engine 154. Thus, in some scenarios, the ingress policy classification engine 154 assigns attributes to the packet descriptor to indicate to downstream processing units how the packet is to be processed.

In other embodiments, the ingress policy classification engine 154 does not utilize a TCAM. For example, a hashing technique or any other suitable technique for classifying multi-field parameters is utilized in other embodiments. Thus, in some embodiments, the TCAM of the ingress policy classification engine 154 is omitted.

A layer-2 (L2) bridge engine 158 is coupled to the ingress policy classification engine 154, according to an embodiment. The L2 bridge engine 158 includes, or is coupled to, a forwarding database 162 that includes MAC destination addresses and indications of the corresponding target ports (e.g., ports 108 of the controlling switch and/or external-facing ports 128 of the PEs) to which packets having the MAC destination addresses should be forwarded. In one embodiment, the forwarding database includes a table of MAC destination addresses and indications of the corresponding target ports (e.g., ports 108/external-facing ports 128). In an embodiment, the forwarding database more generally includes both MAC source addresses and MAC destination addresses, and provides a binding of a MAC address to a port and optionally other parameters. The L2 bridge engine 158 performs MAC source address lookups and MAC destination address lookups, in some embodiments and in at least some scenarios.

In an embodiment, the L2 bridge engine 158 generally uses L2 information (e.g., MAC addresses) to determine to which port or ports (e.g., ports 108/external-facing ports 128) a packet should be forwarded. Determination of whether, and to where a packet should be forwarded, is done by examining the MAC destination address (DA) of the packet and determining to which port the MAC DA corresponds using the forwarding database 162, in some instances. Also, other information is utilized as well in other embodiments and/or instances. For example, VLAN information is utilized in some embodiments and/or instances. For instance, the L2 bridge engine 158 is capable of determining target ports for Layer-2 multicast or broadcast packets using VLAN information, in some embodiments.

The L2 bridge engine 158 also maintains the forwarding database 162, in some embodiments. For instance, the L2 bridge engine 158 learns a port (e.g., an external-facing port 128) to which a MAC source address (SA) of an ingressing packet corresponds by recording the port corresponding to the ingressing packet and associating the port with the MAC SA of the packet, in an embodiment. Thus, when the L2 bridge engine 158 later processes a packet with a MAC DA equal to a particular MAC address in the forwarding database 162, an entry in the forwarding database 162 indicates the port (e.g., the external-facing port 128) to which the packet should be forwarded. The L2 bridge engine 158 learns MAC addresses of external network devices (e.g., outside of the switching system 100) connected to external-facing ports 128 of all of the PEs 120 in the switching system 100, and thus the forwarding database 162 is sufficiently large to accommodate MAC address/port associations for the switching system 100 as a whole, according to an embodiment.

In general, the forwarding database 162 correlates several variables useful for making forwarding decisions. The forwarding database 162 comprises entries based upon VLAN, ports, and MAC addresses, for instance; lookup operations based upon MAC addresses and VLANs are useful in bridging operations, for example. In some embodiments, forwarding database 162 comprises entries based upon virtual ports, where the number of virtual ports is greater than the number of physical ports in the controlling switch. In some embodiments, each virtual port corresponds to a respective physical port, and the pipeline 140 is configured to map virtual ports to physical ports.

An Internet Protocol (IP) router engine 166 is coupled to the L2 bridge engine 158, and the IP router engine 166 performs routing based on IP addresses for certain packets, in some embodiments and/or scenarios. The IP router engine 166 includes, or is coupled to, an IP routing information database (not shown) that includes information corresponding to where IP packets should be forwarded. The IP router engine 166 generally determines to where a received IP packet should be routed, which includes determining the target port to which the packet should be forwarded. Determining to where a received IP packet should be routed includes examining the IP destination address of the packet and routing information stored in the IP routing information database. The IP router engine 166 also maintains the IP routing information database, according to an embodiment.

A multi-protocol label switching (MPLS) router engine 170 is coupled to the IP router engine 166, and the MPLS router engine 170 performs routing based on MPLS header information for certain packets, in some embodiments and/or scenarios. The MPLS router engine 170 includes, or is coupled to, a MPLS routing information database (not shown) that includes information corresponding to where MPLS packets should be forwarded. The MPLS router engine 170 generally determines to where a received MPLS packet should be routed, which includes determining the target port to which the MPLS packet should be forwarded. Determining to where a received MPLS packet should be routed includes examining the MPLS header information in the packet and routing information stored in the MPLS routing information database. The MPLS router engine 170 also maintains the MPLS routing information database, according to an embodiment.

An ingress policer engine 174 is coupled to the MPLS router engine 170. The ingress policer engine 174 generally performs rate limiting, makes flow traffic measurements, and stores flow measurement information for different flows, according to an embodiment. In some embodiments, the ingress policer engine 174 takes different actions for different flows. In an embodiment, the ingress policer engine 174 utilizes flow classification information from the ingress policy classification engine 154 in determining what actions should be taken. The ingress policer engine 174 includes a plurality of counters for making flow traffic measurements, according to an embodiment.

A header alteration unit 176 is coupled to the ingress policer engine 174. In some scenarios, it is necessary to modify the header fields of a packet prior to transmitting the packet (e.g., one or more of removing a tunneling header, adding a tunneling header, changing a next hop IP address, changing a VLAN identifier, adding a tag, modifying a checksum field, modifying a time to live (TTL) field, modifying a hop limit field, etc.).

An egress policy classification engine 178 is coupled to the header alteration unit 176. The egress policy classification engine 178 generally performs flow classification. When the packet belongs to a recognized flow, the egress policy classification engine 178 associates the packet with the flow. For example, the egress policy classification engine 178 attaches a flow ID to a packet descriptor to indicate (e.g., to other units of the pipeline 140 or to one or more PEs) a flow to which the packet belongs, in an embodiment.

An egress policer engine 180 is coupled to the egress policy classification engine 178. The egress policer engine 180 generally performs rate limiting and makes flow traffic measurements, in an embodiment.

A transmit queue manager 182 is coupled to the egress policer engine 180. The transmit queue manager 182 generally queues packet descriptors in a plurality of queues corresponding to different classes of flows and/or different physical ports, for example.

Figure 1C:
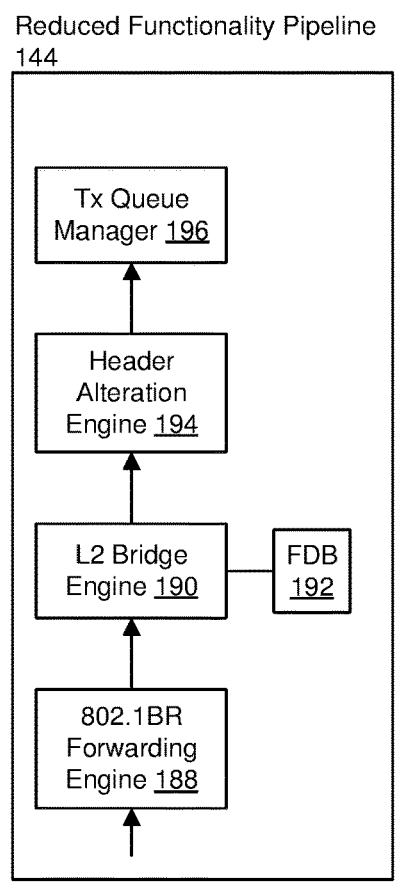
FIG. 1C is a block diagram of an example packet processor pipeline of a PE of FIG. 1A, according to an embodiment.

FIG. 1C is a diagram of an example reduced functionality pipeline 144 of the PE 120-1, according to an embodiment. The reduced functionality pipeline 144 is structured similarly to the pipeline 140 of FIG. 1B, but is shorter and provides fewer functionalities than the pipeline 140. Accordingly, the pipeline 144 is significantly less expensive, and/or may require less power, than the pipeline 140, according to some embodiments.

An 802.1BR forwarding engine 188 performs functions corresponding to packet forwarding in accordance with the IEEE 802.1BR Standard. For example, the 802.1BR forwarding engine 188 analyzes tags (sometimes referred to as E-tags) added to ingressing packets by another PE or the controlling switch 104. For ingressing packets that do not already include an E-tag, the 802.1BR forwarding engine 188 adds an E-tag to the packet or indicates in a packet descriptor corresponding to the packet that an E-tag should be added to the packet by a subsequent pipeline unit (e.g., a header alteration engine).

In general, an E-tag includes information that can be used by the controlling switch 104 and/or PEs 120 to forward a packet through the network switching system 100. In an embodiment, the E-tag is included in, or appended to, a header of the packet by a source PE 120, and is removed from the packet by a target PE 120 before or as the packet egresses the network switching system 100. In one embodiment, the E-tag includes indications of one or more of i) a source PE 120 that first received the packet, ii) a target PE 120 to which the packet is to be forwarded, iii) a source external-facing port 128 at which the packet was first received, iv) a target external-facing port 128 of the target PE 120 that is to egress the packet from the network switching system 100, etc. In other embodiments, the E-tag additionally or alternatively includes other suitable information that assists forwarding the packet through the network switching system 100.

The 802.1BR forwarding engine 188 includes, or is coupled to, a table (not shown) that includes information associating target port identification information (e.g., in E-tags of packets) with ports of the PE 120-1. For example, if another PE 120 or the controlling bridge 104 has made a forwarding decision for an ingressing packet and has included an indicator (e.g., an ID) of a target port in an E-tag of the packet, the 802.1BR forwarding engine 188 uses the indicator to look up in the table an indicator of a local port of the PE 120-1 to which the packet is to be forwarded, according to an embodiment.

An L2 bridge engine 190 is coupled to the 802.1BR forwarding engine 188. In an embodiment, a structure of the L2 bridge engine 190 is similar to the L2 bridge engine 158 of the controlling switch 104, but provides reduced functionality and thus is cheaper to manufacture, and/or consumes less power, than the L2 bridge engine 158.

The L2 bridge engine 190 also maintains a forwarding database 192, in some embodiments. The forwarding database 192 is coupled to the L2 bridge engine and includes MAC destination addresses and indications of the corresponding target ports to which packets having the MAC destination addresses should be forwarded. The L2 bridge engine 190 learns source MAC address/port associations only for ingressing packets received via downstream ports 128 of the PE 120, i.e., the L2 bridge engine 190 does not learns source MAC address/port associations for ingressing packets received via the upstream port 124, in an embodiment. Thus, the forwarding database 192 contains MAC address/port associations only for external network devices (e.g., outside of the switching system 100) that are communicatively coupled to the PE 120-1 directly or indirectly via the downstream ports 128, and does not contain MAC address/port associations for external devices that are communicatively coupled to the PE 120-1 indirectly only via the upstream port 124, according to an embodiment. Referring to FIG. 1A, as an illustrative example, the forwarding database 192 of the PE 120-1 contains MAC address/port associations for external devices that are communicatively coupled to the PE 120-1 directly or indirectly via the downstream ports 128 of the PE 120-1, but does not contains MAC address/port associations for other external devices that are communicatively coupled to downstream ports the PE 120-2, PE 120-3, PE 120-4, and the PE 120-5. The forwarding database 192 of the PE 120-1 does not contains MAC address/port associations for other external devices that are communicatively coupled to downstream ports of PE 120-2, PE 120-3, PE 120-4, and PE 120-5 because the PE 120-1 is communicatively coupled to PE 120-2, PE 120-3, PE 120-4, and PE 120-5 only via the upstream port 124, according to an embodiment.

In general, the forwarding database 192 correlates several variables useful for making forwarding decisions. The forwarding database 192 comprises entries based upon one or more of VLANs, ports, and MAC addresses, according to various embodiments. In some embodiments, forwarding database 192 comprises entries based upon virtual ports, where the number of virtual ports is greater than the number of physical ports in the PE. In some embodiments, each virtual port corresponds to a respective physical port, and the pipeline 144 is configured to map virtual ports to physical ports.

Because the forwarding database 192 contains MAC address/port associations only for external network devices that are communicatively coupled to the PE 120-1 directly or indirectly via the downstream ports 128, and does not contains MAC address/port associations for other external devices that are communicatively coupled to the PE 120-1 only via the upstream port 124, the forwarding database 192 is significantly smaller than the forwarding database 162 of the controlling switch 104. For example, as an illustrative embodiment, the forwarding database 162 comprises a memory device of size 128 kilobytes (or 128 kilowords) whereas the forwarding database 192 comprises a memory device of size 4 kilobytes (or 4 kilowords). In other embodiments, the memory devices of the forwarding databases 162, 192 have suitable sizes different than 128 kilobytes (or 128 kilowords) and 4 kilobytes (or 4 kilowords). More generally, the forwarding database 162 comprises a memory device of a size that is one or more orders of magnitude larger than as size of a memory device of the forwarding database 192, according to an embodiment. Because the forwarding database 192 of the PE 120 is significantly smaller than the forwarding database 162 of the controlling switch 104, a cost of the forwarding database 192 of the PE 120 is significantly smaller than a cost of the forwarding database 162 of the controlling switch 104, according to an embodiment.

A header alteration unit 194 is coupled to the L2 bridge engine 190. In an embodiment, a structure of the header alteration unit 194 is similar to the header alteration unit 176 of the controlling switch 104, but provides reduced functionality and thus is cheaper to manufacture than the header alteration unit 176. For example, the header alteration unit 194 is not capable of modifying some header fields that the header alteration unit 176 of the controlling switch 104 is capable of modifying, according to an embodiment. In another embodiment, however, the header alteration unit 194 has a structure the same as or similar to the header alteration unit 176 of the controlling switch 104, and provides the same functionality as the header alteration unit 176.

A transmit queue manager 196 is coupled to the header alteration unit 194. The transmit queue manager 196 generally queues packet descriptors in a plurality of queues corresponding to different classes of flows and/or different physical ports, for example. In an embodiment, the transmit queue manager 196 has a structure that is the same as or similar to the transmit queue manager 182.

The pipelines 140 and 144 of FIGS. 1B and 1C are merely illustrative examples. In other embodiments, suitable packet processing pipelines include additional and/or alternative pipeline engines/units. For example, additional pipeline engines/units are included between engines/units illustrated in FIGS. 1B and 1C, one or more engines/units illustrated in FIGS. 1B and 1C are omitted, and/or the order of two or more engines/units illustrated in FIGS. 1B and 1C is changed. For example, in some embodiments, the header alteration engine 176 (FIG. 1B) is included between the Tx Queue Manager 182 and the Egress Policer Engine 180.

Figures 2A, 2B:
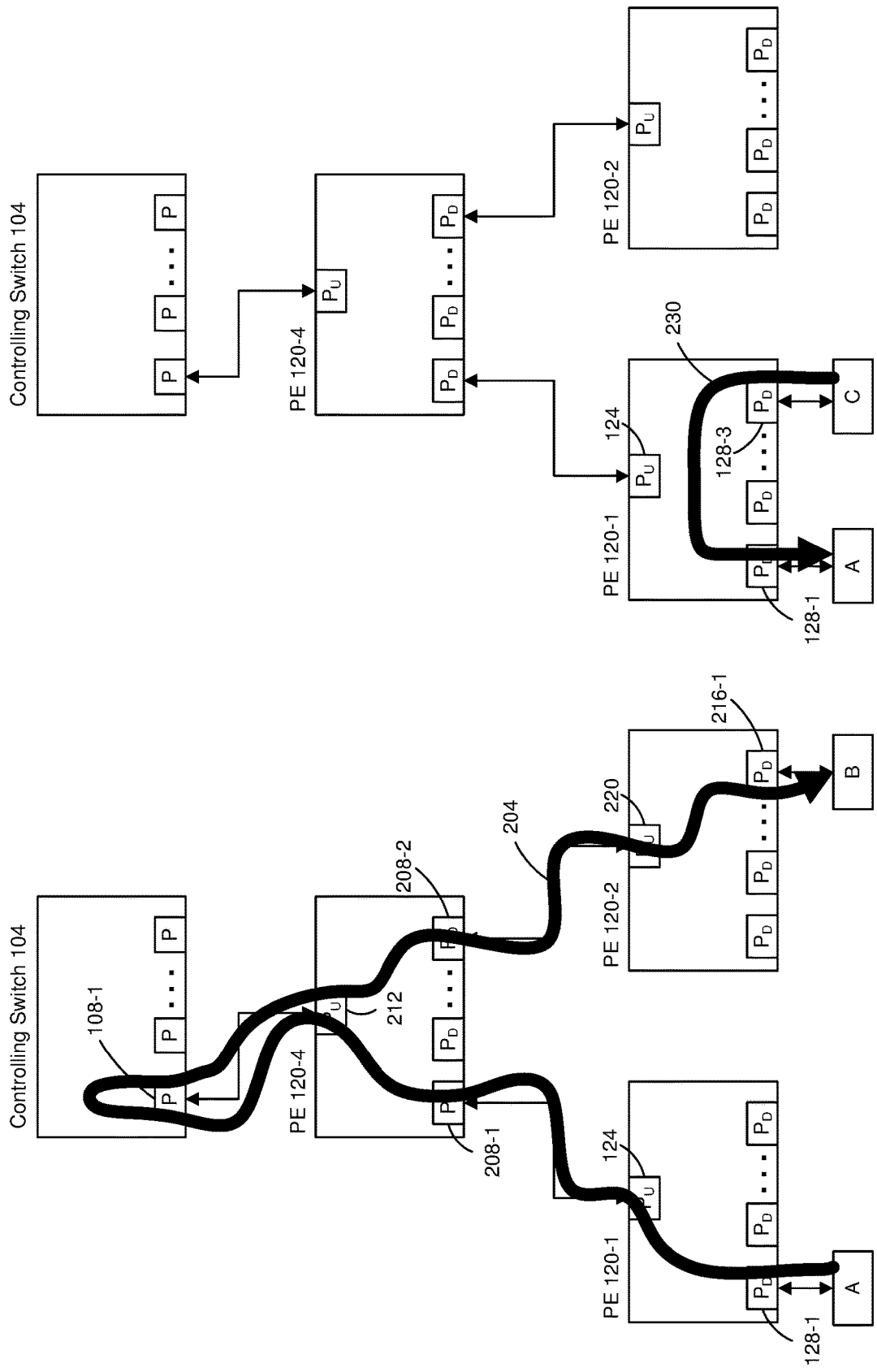
FIG. 2A is a diagram of a portion of the network switching system of FIG. 1A illustrating an example path of a packet through the network switching system, according to an embodiment.
FIG. 2B is a diagram of the portion of the network switching system of FIG. 1A illustrating another example path of another packet through the network switching system, according to an embodiment.

FIG. 2A is a diagram of a portion of the network switching system 100 of FIG. 1A illustrating an example path 204 of a first packet through the network switching system 100, according to an embodiment. The first packet includes a MAC header with a MAC SA corresponding to an external network device A (MAC-A) and a MAC DA corresponding to an external network device B (MAC-B).

The first packet is received at the downstream port 128-1 of the PE 120-1 from the external network device A, and the packet processor 132 adds an E-tag to the first packet. In an embodiment, the packet processor 132 records an identifier of the port 128-1 in the E-tag to indicate that the first packet was received via downstream port 128-1.

The forwarding database 192 of the PE 120-1 does not include an entry corresponding to MAC-B (i.e., the MAC DA) so the packet processor 132 (e.g., the L2 bridge engine 190) forwards the first packet to the upstream port 124. Additionally, the packet processor 132 (e.g., the L2 bridge engine 190) records an association of port 128-1 with MAC-A in the forwarding database 192 (assuming that the association between port 128-1 and MAC-A was not already stored in the forwarding database 192). In other words, the packet processor 132 (e.g., the L2 bridge engine 190) learns the association of port 128-1 with MAC-A.

The first packet is then received at a downstream port 208-1 of the PE 120-4. The forwarding database of the PE 120-4 also does not include an entry corresponding to MAC-B, so the packet processor (e.g., the L2 bridge engine) of the PE 120-4 forwards the first packet to an upstream port 212 of the PE 120-4. Additionally, the packet processor (e.g., the L2 bridge engine 190) of the PE 120-4 records an association of port 208-1 with MAC-A in the forwarding database (assuming the association between port 208-1 and MAC-A was not already stored in the forwarding database). In other words, the packet processor (e.g., the L2 bridge engine) of the PE 120-4 learns the association of port 208-1 with MAC-A. Additionally, the PE 120-4 records in the forwarding database, along with the association of port 208-1 with MAC-A, an association with downstream port 128-1 of PE 120-1 because the E-tag of the first packet indicated that the first packet was received by the network switching system 100 at downstream port 128-1 of PE 120-1.

The first packet is then received at the port 108-1 of the controlling switch 104. The forwarding database 162 of the controlling switch 104 includes an entry corresponding to MAC-B, and the packet processor 116 (e.g., the L2 bridge engine 158) of the controlling switch 104 determines, based on the entry in the forwarding database 162 corresponding to MAC-B, that the first packet should be transmitted via the downstream port 216-1 of the PE 120-2. Additionally, the packet processor 116 (e.g., the L2 bridge engine 158) of the controlling switch 104 modifies the E-tag of the first packet to indicate that the first packet should be transmitted via the downstream port 216-1 of the PE 120-2. Further, the packet processor 116 (e.g., the L2 bridge engine 158) determines that the first packet should be forwarded to the port 108-1 of the controlling switch 104 and thus forwards the first packet to the port 108-1.

The first packet is then received at the upstream port 212 of the PE 120-4. The packet processor of the PE 120-4 examines the E-tag of the first packet and determines that the packet is to be transmitted via the downstream port 216-1 of the PE 120-2. Further, the packet processor of the PE 120-4 determines that the first packet should be forwarded to a port 208-2 of the PE 120-4 and thus forwards the first packet to the port 208-2.

The first packet is then received at an upstream port 220 of the PE 120-2. The packet processor of the PE 120-2 examines the E-tag of the first packet and determines that the packet is to be transmitted via the downstream port 216-1 of the PE 120-2. The packet processor of the PE 120-2 removes the E-tag from the first packet and forwards the first packet to the downstream port 216-1, which then transmits the first packet to the external device B.

Because the first packet was received via the upstream port 220, however, the packet processor (e.g., the L2 bridge engine) of the PE 120-2 does not learn an association between the upstream port 220 and MAC-A. In other words, the packet processor of the PE 120-2 does not record an association of upstream port 220 with MAC-A in the forwarding database.

FIG. 2B is a diagram of the portion of the network switching system 100 of FIG. 2A illustrating an example path 230 of a second packet through the network switching system 100, according to an embodiment. The second packet is received by the network switching system 100 after the first packet. The second packet includes a MAC header with a MAC SA corresponding to an external network device C (MAC-C) and a MAC DA corresponding to the external network device A (MAC-A).

The second packet is received at the downstream port 128-3 of the PE 120-1 from the external network device C, and the packet processor 132 adds an E-tag to the second packet. In an embodiment, the packet processor 132 records an identifier of the port 128-3 in the E-tag to indicate that the second packet was received via downstream port 128-3.

Because an association between MAC-A (i.e., the MAC DA) and the downstream port 128-1 in connection with the processing of the first packet (as discussed in connection with FIG. 2A), the forwarding database 192 of the PE 120-1 includes an entry corresponding to MAC-A which indicates that the second packet should be forwarded to the downstream port 128-1. Therefore, the packet processor 132 (e.g., the L2 bridge engine 190) determines, based on the entry in the forwarding database 192 corresponding to MAC-A, that the second packet should be forwarded to the downstream port 128-1. Additionally, the packet processor 132 (e.g., the L2 bridge engine 190) records an association of port 128-3 with MAC-C in the forwarding database 192 (assuming that the association between port 128-3 and MAC-C was not already stored in the forwarding database 192). In other words, the packet processor 132 (e.g., the L2 bridge engine 190) learns the association of port 128-3 with MAC-C.

The packet processor 132 (not seen in FIG. 2B but disposed in PE 120-1) removes the E-tag from the second packet and the downstream port 128-1 then transmits the second packet to the external device A. In another embodiment, on the other hand, because the packet processor 132 (e.g., the L2 bridge engine 190) was able to determine, based on the entry in the forwarding database 192 corresponding to MAC-A, that the second packet should be forwarded to a downstream port local to the PE 120-1 and did not need to be forwarded to the upstream port 124, the packet processor 132 never adds the E-tag to the second packet and thus an E-tag does not need to be removed prior to transmitting the second packet via the downstream port 128-1.

As can be seen in FIG. 2B, because the PE 120-1 was able to determine locally that the second packet was to be transmitted via another downstream port of the PE 120-1, the second packet did not need to be forwarded up to the controlling switch 104 and back down to the PE 120-1, as in the path 204 of FIG. 2A, as would be necessitated in a conventional network switching system. Thus, the latency of the second packet within the network switching system 100 is reduced and traffic within the network switching system 100 is reduced as compared to when a packet is forwarded up to the controlling switch 104 and back down to a PE 120.

Figure 2C:
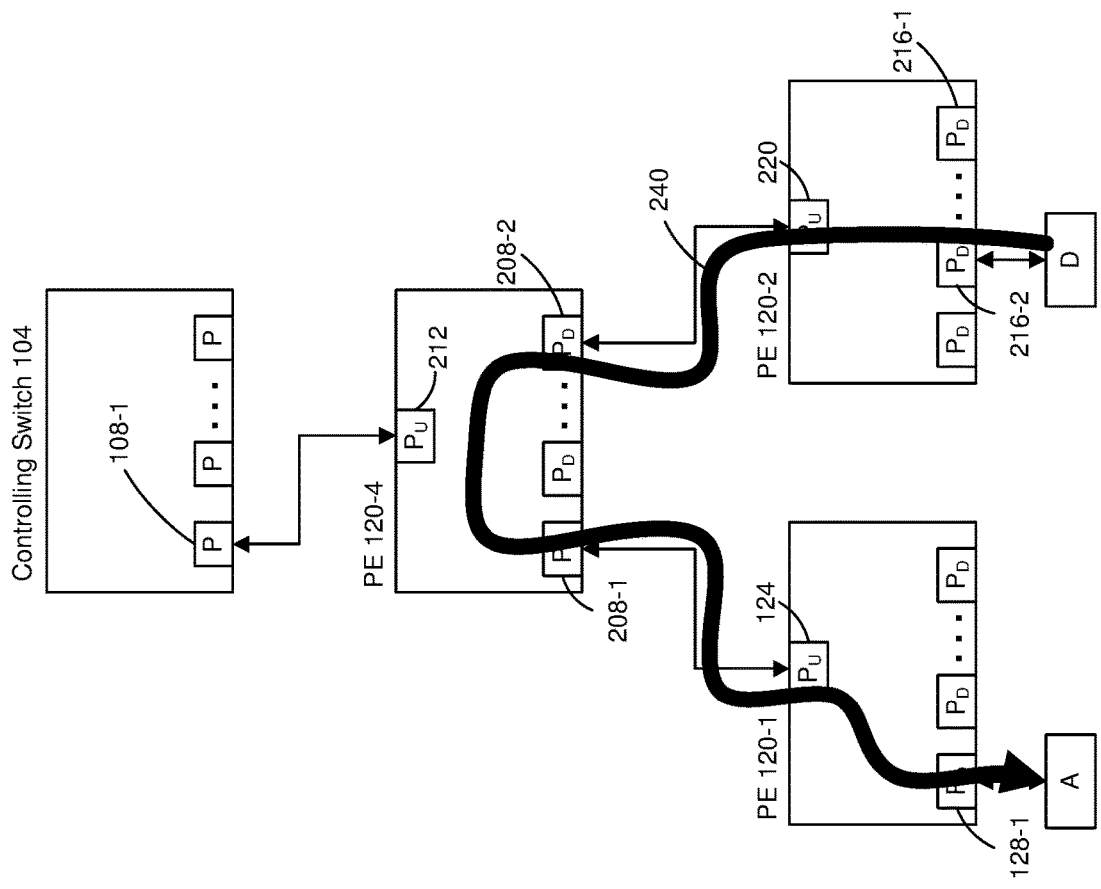
FIG. 2C is a diagram of the portion of the network switching system of FIG. 1A illustrating yet another example path of yet another packet through the network switching system, according to an embodiment.

FIG. 2C is a diagram of the portion of the network switching system 100 of FIG. 2A illustrating an example path 240 of a third packet through the network switching system 100, according to an embodiment. The third packet is received by the network switching system 100 after the first packet. The third packet includes a MAC header with a MAC SA corresponding to an external network device D (MAC-D) and a MAC DA corresponding to the external network device A (MAC-A).

The third packet is received at the downstream port 216-2 of the PE 120-2, and the packet processor of the PE 120-2 adds an E-tag to the third packet. In an embodiment, the packet processor 132 records an identifier of the port 216-2 and PE 120-2 in the E-tag to indicate that the third packet was received via downstream port 216-2 of PE 120-2.

The forwarding database of the PE 120-2 does not include an entry corresponding to MAC-A (i.e., the MAC DA) so the packet processor (e.g., the L2 bridge engine) forwards the third packet to the upstream port 220 of the PE 120-2. Additionally, the packet processor (e.g., the L2 bridge engine) records an association of port 216-2 with MAC-D in the forwarding database 192 (assuming that the association between port 216-2 and MAC-D was not already stored in the forwarding database 192). In other words, because the packet from MAC-D arrived at a downstream port 216-2, the packet processor (e.g., the L2 bridge engine) learns the association of port 216-2 with MAC-D, if necessary.

The third packet is then received at a downstream port 208-2 of the PE 120-4. Because an association between MAC-A (i.e., the MAC DA) and the downstream port 208-1 was learned in connection with the processing of the first packet (as discussed in connection with FIG. 2A), the forwarding database of the PE 120-1 includes an entry corresponding to MAC-A which indicates that the second packet should be forwarded to the downstream port 128-1. Therefore, the packet processor 132 (e.g., the L2 bridge engine 190) determines, based on the entry in the forwarding database 192 corresponding to MAC-A, that the second packet should be forwarded to the downstream port 128-1.

Additionally, the entry corresponding to MAC-A in the forwarding database of PE 120-4 also indicates that the ultimate target port for the third packet is the downstream port 128-1 of PE 120-1. Thus, because the destination is a downstream port, the packet processor of the PE 120-4 modifies the E-tag of the third packet to indicate that the ultimate target port for the third packet is the downstream port 128-1 of PE 120-1.

Further, the packet processor (e.g., the L2 bridge engine) of the PE 120-4 records an association of port 208-2 with MAC-D in the forwarding database (assuming the association between port 208-2 and MAC-D was not already stored in the forwarding database). In other words, the packet processor (e.g., the L2 bridge engine) of the PE 120-4 learns the association of port 208-2 with MAC-D. Additionally, the packet processor of the PE 120-4 records in the forwarding database, along with the association of port 208-2 with MAC-D, an association with downstream port 216-2 of PE 120-2 because the E-tag of the third packet indicated that the third packet was received by the network switching system 100 at downstream port 216-2 of PE 120-2.

The packet processor of the PE 120-4 then forwards the third packet to the downstream port 208-1.

The third packet is then received at the upstream port 124 of the PE 120-1. The packet processor 132 of the PE 120-1 examines the E-tag of the third packet and determines that the third packet is to be transmitted via the downstream port 128-1. The packet processor 132 removes the E-tag from the third packet and forwards the third packet to the downstream port 128-1, which then transmits the third packet to the external device A.

As seen in FIG. 2C, because the PE 120-4 was able to determine locally that the third packet was to be transmitted via another downstream port of the PE 120-4, the third packet did not need to be forwarded up to the controlling switch 104 and back down to the PE 120-4, as in the path 204 of FIG. 2A. Thus, the latency of the third packet within the network switching system 100 is reduced and traffic within the network switching system 100 is reduced as compared to when a packet is forwarded up to the controlling switch 104 and back down to a PE 120.

Figure 3:
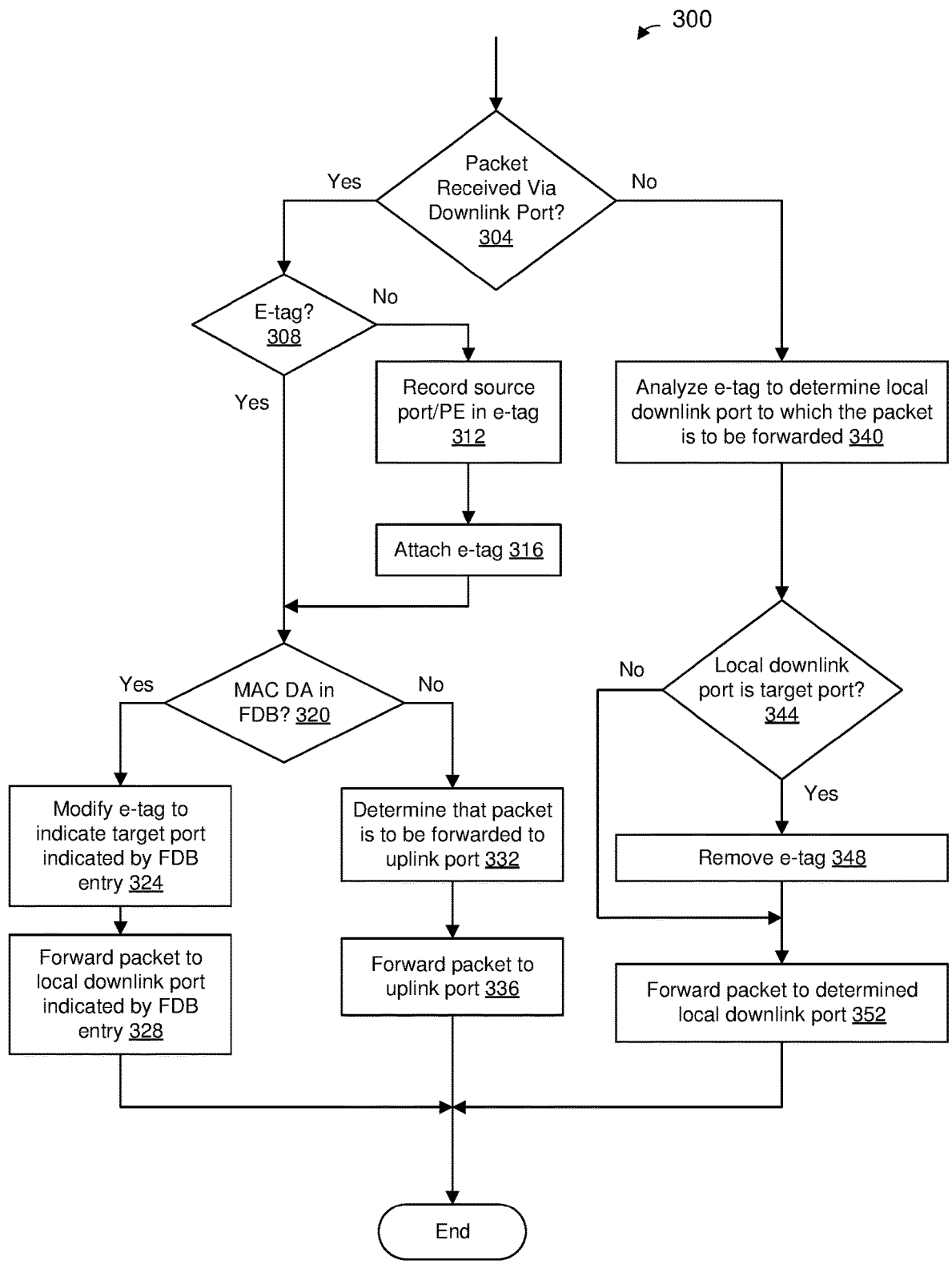
FIG. 3 is a flow diagram of an example method for forwarding a packet in a network device having downstream ports and an upstream port such as a PE, according to an embodiment.

FIG. 3 is a flow diagram of an example method 300 for forwarding a packet in a network device having downstream ports and an upstream port such as a port extender (PE), according to an embodiment. The method 300 is implemented at least partially by the packet processor 132 (FIG. 1), the pipeline 144, and/or the L2 bridge engine 190, according to various embodiments, and the method 300 is discussed with reference to FIGS. 1A and 1C for explanatory purposes. In other embodiments, however, the method 300 is implemented by another suitable packet processor device, such as a packet processor device having an L2 bridge engine that is not a pipeline unit of a pipeline.

At block 304, the packet processor 132 determines whether a packet was received via a downstream port of the PE. For example, a descriptor corresponding to the packet includes information indicating the port of the PE on which the packet was received, and block 304 includes analyzing the information in packet descriptor to determine whether the packet was received via a downstream port of the PE.

If the packet processor 132 determines at block 304 that the packet was received via a downstream port of the PE, the flow proceeds to block 308. At block 308, the packet processor 132 determines whether the packet included an E-tag when received by the PE. If the packet processor 132 determines that the packet did not include an E-tag when received by the PE, the flow proceeds to block 312. At block 312, the packet processor generates an E-tag for the packet. In an embodiment, block 312 includes recording in the E-tag an indication of i) the port of the PE at which the packet was received, and ii) the PE at which the packet was received. In an embodiment, the indication of i) the port of the PE at which the packet was received, and ii) the PE at which the packet was received comprises a single indicator such as a global port identifier (ID) that uniquely identifies the port of the PE from among all ports in the network switching system 100, or some other suitable single indicator. In another embodiment, the indication of i) the port of the PE at which the packet was received, and ii) the PE at which the packet was received comprises two separate indicators such as: a device ID that identifies the PE from among the plurality of PEs in the network switching system 100, and ii) a local port ID that identifies the port of the PE and that does not uniquely identify the port from of the PE from among all ports in the network switching system 100.

At block 316, the packet processor 132 attaches the E-tag to the packet. The flow then proceeds to block 320.

On the other hand, if the packet processor 132 determines that the packet did include an E-tag when received by the PE, the flow also proceeds to block 320.

At block 320, the packet processor 132 determines whether forwarding information corresponding to a MAC destination address (DA) of the packet is included in the forwarding database 192. For example, the L2 bridge engine 190 performs a lookup in the forwarding database 192 with the MAC DA of the packet. If the packet processor 132 (e.g., the L2 bridge engine 190) determines that the forwarding database 192 includes forwarding information corresponding to the MAC DA of the packet, the flow proceeds to block 324. In other embodiments, block 320 additionally or alternatively includes determining whether the forwarding information corresponding to other header information in the packet, such as a VLAN address, is included in the forwarding database 192.

At block 324, the packet processor 132 (e.g., the L2 bridge engine 190 or another component of the pipeline 144) modifies the E-tag of the packet to include an indicator of a target port for the packet determined from an entry in the forwarding database 192 corresponding to the MAC DA of the packet, where the target port may be a local downstream port of the PE or a downstream port of another PE that is communicatively coupled to the PE directly or indirectly via a downstream port of the PE. For instance, the forwarding database 192 includes an entry corresponding to the MAC DA of the packet, the entry including an indication of a target port (e.g., a global port ID, a device ID/local port ID tuple, etc.), and the packet processor 132 (e.g., the L2 bridge engine 190 or another component of the pipeline 144) modifies the E-tag of the packet to include the indication of the target port retrieved from the entry in the forwarding database 192.

At block 328, the packet processor 132 (e.g., the L2 bridge engine 190 and/or another component of the pipeline 144) forwards the packet to a local downstream port of the PE indicated by the entry in the forwarding database 192 corresponding to the MAC DA of the packet. For instance, the entry in the forwarding database 192 corresponding to the MAC DA of the packet includes an indication of a local downstream port a local port ID), and the packet processor 132 (e.g., the L2 bridge engine 190 and/or another component of the pipeline 144) determines the local downstream port to which the packet is to be forwarded using the indication of the local downstream port retrieved from the entry in the forwarding database 192.

On the other hand, if the packet processor 132 (e.g., the L2 bridge engine 190) determines at block 320 that the forwarding database 192 does not include forwarding information corresponding to the MAC DA of the packet, the flow proceeds to block 332. At block 332, the packet processor 132 (e.g., the L2 bridge engine 190 or another component of the pipeline 144) determines that the packet is to be forwarded to the upstream port of the PE. Thus, at block 336, the packet processor 132 (e.g., the L2 bridge engine 190 and/or another component of the pipeline 144) forwards the packet to the upstream port of the PE.

If the packet processor 132 determines at block 304 that the packet was not received via a downstream port of the PE (e.g., the packet processor 132 determines that the packet was received via the upstream port of the PE), the flow proceeds to block 340. At block 340, the packet processor 132 analyzes the E-tag of the packet to determine a local downstream port to which the packet is to be forwarded. For example, the packet processor 132 maintains a table indicating associations between i) downstream ports of other PEs directly or indirectly coupled to downstream ports of the PE, and ii) local downstream ports of the PE, and the packet processor 132 uses the indication of the target port in the E-tag and an entry in the table to determine a local downstream to which the packet is to be forwarded. In an embodiment, if the target port indicated by the E-tag is a local downstream port of the PE, the packet processor 132 does not need to examine the table to determine the local downstream port.

At block 344, the packet processor 132 determines whether the target port for the packet (e.g., indicated in the E-tag) is a local downstream port of the PE. If the packet processor 132 determines that the target port for the packet (e.g., indicated in the E-tag) is a local downstream port of the PE, the flow proceeds to block 348, at which the packet processor 132 removes the E-tag from the packet. At block 352, the packet processor 132 forwards the packet to the local downstream port determined at block 340. In other words, if the packet processor 132 determines at block 344 that the target port for the packet (e.g., indicated in the E-tag) is a local downstream port of the PE, the E-tag is removed from the packet (block 348) and the packet is transmitted by the PE without the E-tag.

On the other hand, if the packet processor 132 determines at block 344 that the target port for the packet (e.g., indicated in the E-tag) is not a local downstream port of the PE, the flow skips block 348 and proceeds to block 352. In other words, if the packet processor 132 determines at block 344 that the target port for the packet (e.g., indicated in the E-tag) is not a local downstream port of the PE, the E-tag is not removed from the packet and the packet is transmitted by the PE with the E-tag.

The flow 300 is merely an illustrative embodiment. In other embodiments, the ordering of blocks is changed, one or more additional blocks are included, and/or one or more blocks are omitted.

Although FIG. 3 was described in the context of determining whether forwarding information corresponding to a MAC address is in a forwarding database, in other embodiments, a similar method comprises determining whether forwarding information corresponding to other types of network address information is in a forwarding databases, such as VLAN identifiers, IP addresses, etc.

FIG. 4 is a flow diagram of an example method 400 for updating a forwarding database in a network device having downstream ports and an upstream port such as a port extender (PE), according to an embodiment. The method 400 is implemented at least partially by the packet processor 132 (FIG. 1), the pipeline 144, and/or the L2 bridge engine 190, according to various embodiments, and the method 400 is discussed with reference to FIGS. 1A and 1C for explanatory purposes. In other embodiments, however, the method 400 is implemented by another suitable packet processor device, such as a packet processor device having an L2 bridge engine that is not a pipeline unit of a pipeline.

At block 404, the packet processor 132 determines whether a packet was received via a downstream port of the PE. For example, a descriptor corresponding to the packet includes information indicating the port of the PE on which the packet was received, and block 404 includes analyzing the information in packet descriptor to determine whether the packet was received via a downstream port of the PE.

If the packet processor 132 determines at block 404 that the packet was not received via a downstream port of the PE (e.g., the packet processor 132 determines that the packet was received via the downstream port of the PE), the flow ends and the forwarding database is not updated in response to receiving the packet. In other words, if the packet processor 132 determines that the packet was not received via a downstream port of the PE (e.g., the packet processor 132 determines that the packet was received via the downstream port of the PE), the packet processor does not learn a MAC SA of the packet.

On the other hand, if the packet processor 132 determines at block 404 that the packet was received via a downstream port of the PE, the flow proceeds to block 408. At block 408, the packet processor 132 determines whether forwarding information corresponding to the MAC SA of the packet is included in the forwarding database 192. For example, the L2 bridge engine 190 performs a lookup in the forwarding database 192 with the MAC SA of the packet. If the packet processor 132 (e.g., the L2 bridge engine 190) determines that the forwarding database 192 includes forwarding information corresponding to the MAC SA of the packet, the flow ends.

On the other hand, if the packet processor 132 (e.g., the L2 bridge engine 190) determines that the forwarding database 192 does not include forwarding information corresponding to the MAC SA of the packet, the flow proceeds to block 412. At block 412, the packet processor 132 (e.g., the L2 bridge engine 190 or another component of the pipeline 144) adds an entry to the forwarding database 192, where the entry associates the MAC SA with the local downstream port at which the packet was received. For example, the descriptor corresponding to the packet includes information indicating the local downstream port of the PE (e.g., a port ID) at which the packet was received, and block 412 includes using the information in packet descriptor indicating the local downstream port of the PE (e.g., a port ID) at which the packet was received to generate the entry of the forwarding database 192.

In an embodiment, if the packet was received from another PE, block 412 includes generating the entry to include information that associates the MAC SA with a source port at which the packet was first received by the network switching system 100 (e.g., an indication of the other PE and the port of the other PE at which the packet was received). For example, if the packet included an E-tag when the packet was received at the PE, the E-tag of the packet includes an indication of a source port of another PE at which the packet was first received by the network switching system 100 (e.g., a global port ID, a device ID/local port ID tuple, etc.), according to an embodiment. Thus, block 412 includes using the information in the E-tag indicating the other PE and the downstream port of the other PE at which the packet was first received by the network switching system 100 to generate the entry of the forwarding database 192.

In other embodiments, block 408 additionally or alternatively includes determining whether the information corresponding to other header information in the packet, such as a VLAN identifier, is included in the forwarding database 192. Similarly, block 412 additionally or alternatively includes storing association information between ports and other types of network address information, such as a VLAN identifier, in the forwarding database 192, according to other embodiments.

The flow 400 is merely an illustrative embodiment. In other embodiments, the ordering of blocks is changed, one or more additional blocks are included, and/or one or more blocks are omitted.

Although FIG. 4 was described in the context of storing associations between MAC addresses and ports in a forwarding database, in other embodiments, a similar method comprises storing associations between other types of network address information and ports, such as VLANs, IP addresses, etc.

In an embodiment, a packet processor device is configured to perform both the method of FIG. 3 and the method of FIG. 4. For example, block 304 and of FIG. 3 and block 404 of FIG. 4 are combined and implemented as a single block of a single method that includes the other blocks of the method 300 and the method 400, according to an illustrative method.

In an embodiment, a port extender is for use in a switching system comprising a controlling switch and one or more other port extenders. The port extender comprises: at least one local upstream port coupled to the controlling switch directly or via another port extender; a plurality of local downstream ports; and a forwarding engine coupled to the at least one local upstream port and the plurality of local downstream ports, the forwarding engine including, or being coupled to, a forwarding database that is populated with entries indicating associations between i) respective network addresses corresponding to devices coupled to local downstream ports of the port extender a) directly or b) via one or more other port extenders downstream from the port extender, and ii) respective local downstream ports of the port extender, wherein the forwarding database excludes entries corresponding to network addresses corresponding to devices coupled directly, or via another port extender upstream from the port extender, to the at least one local upstream port of the port extender. The forwarding engine is configured to: for a first packet i) received via one of the local downstream ports, and ii) having a destination network address in the forwarding database, forward the first packet to a different local downstream port indicated by the forwarding database, and for a second packet i) received via one of the local downstream ports, and ii) having a destination network address not in the forwarding database, forward the second packet to the at least one local upstream port.

In other embodiments, the port extender comprises one of, or any suitable combination of two or more of, the following features.

The forwarding database is populated by entries that further indicate associations between i) respective network addresses of devices coupled to downstream ports of the port extender via one or more other port extenders downstream from the port extender, and ii) respective ports of one or more other port extenders, downstream from the port extender, to which the devices are coupled; the forwarding engine is a component of a packet processor disposed in the port extender; and the packet processor is configured to, when an entry in the forwarding database indicates that a destination network address of the first packet is associated with a downstream port of another port extender, include in a tag corresponding to the first packet an indication of i) the other port extender, and ii) the downstream port of the other port extender.

The packet processor is configured to, when the entry in the forwarding database indicates that the destination network address of the first packet is associated with the downstream port of the other port extender: include in the tag corresponding to the first packet a global port identifier that identifies i) the other port extender, and ii) the downstream port of the other port extender.

The packet processor is configured to, when the entry in the forwarding database indicates that the destination network address of the first packet is associated with the downstream port of the other port extender: include in the tag corresponding to the first packet i) a device identifier that identifies the other port extender, and ii) a local port identifier that identifies the downstream port of the other port extender.

The packet processor is configured to, when the first packet did not include the tag when the first packet was received by the port extender and when the entry in the forwarding database indicates that the destination network address of the first packet is associated with the downstream port of the other port extender: attach the tag to the first packet prior to transmitting the first packet via the local downstream port indicated by the forwarding database.

The forwarding engine is configured to: populate the forwarding database with network address/port association information based on source network addresses of packets received via the plurality of local downstream ports; and not populate the forwarding database with network address/port association information based on source network addresses of any packets received via the at least one local upstream port.

The first packet is received via a local downstream port; the first packet includes a tag having an indication of i) another port extender at which the first packet was originally received by the switching system, and ii) a port of the other port extender at which the first packet was originally received by the switching system; and the forwarding engine is configured to: retrieve the indication from the tag, and store in an entry of the database associated with a network source address (SA) of the first packet, an indication of an association between i) the network SA, ii) an indicator of the local downstream port via which the first packet was received by the packet extender, and iii) the indication of a) the other port extender at which the first packet was originally received by the switching system, and b) the port of the other port extender at which the first packet was originally received by the switching system.

The forwarding database is populated with entries indicating associations between i) respective media access control (MAC) addresses of devices coupled to local downstream ports of the port extender a) directly or b) via one or more other port extenders downstream from the port extender, and ii) respective local downstream ports of the port extender, wherein the forwarding database excludes entries corresponding to MAC addresses of devices coupled directly, or via another port extender, to the at least one local upstream port of the port extender; and the forwarding engine is configured to: for the first packet i) received via one of the local downstream ports, and ii) having a destination MAC address in the forwarding database, forward the first packet to the different local downstream port indicated by the forwarding database, and for the second packet i) received via one of the local downstream ports, and ii) having a destination MAC address not in the forwarding database, forward the second packet to the at least one local upstream port.

The forwarding engine is a component of a first packet processor disposed in the port extender; the first packet processor comprises a first pipeline with a first number of pipeline elements; the controlling switch comprises a second packet processor having a second pipeline with a second number of pipeline elements; and the first number of pipeline elements is less than the second number of pipeline elements.

In another embodiment, a method is implemented in a port extender in a switching system that includes a controlling switch and one or more other port extenders. The method includes: receiving packets via at least one local upstream port of the port extender, the at least one upstream port being coupled to the controlling switch directly or via an intermediate port extender; receiving packets via a plurality of local downstream ports of the port extender; for packets received via the plurality of downstream ports, search a forwarding database that is populated with entries indicating associations between i) respective network addresses corresponding to devices coupled to local downstream ports of the port extender a) directly or b) via one or more other port extenders downstream from the port extender, and ii) respective local downstream ports of the port extender, wherein the forwarding database excludes entries corresponding to network addresses corresponding to devices coupled directly, or via another port extender upstream from the port extender, to the at least one local upstream port of the port extender; for a first packet i) received via one of the local downstream ports, and ii) having a destination network address in the forwarding database, forwarding the first packet to a different local downstream port indicated by the forwarding database; and for a second packet i) received via one of the local downstream ports, and ii) having destination network addresses not in the forwarding database, forwarding the second packet to the at least one local upstream port.

In other embodiments, the method includes one of, or any suitable combination of two or more of, the following features.

The forwarding database is populated by entries that further indicate associations between i) respective network addresses corresponding to devices coupled to downstream ports of the port extender via one or more other port extenders downstream from the port extender, and ii) respective ports of one or more other port extenders, downstream from the port extender, to which the devices are coupled; and the method further comprises, when an entry in the forwarding database indicates that a destination network address of the first packet is associated with a downstream port of another port extender, including in a tag corresponding to the first packet an indication of i) the other port extender, and ii) the downstream port of the other port extender.

The method further includes, when the entry in the forwarding database indicates that the destination network address of the first packet is associated with the downstream port of the other port extender: including in the tag corresponding to the first packet a global port identifier that identifies i) the other port extender, and ii) the downstream port of the other port extender.

The method further includes, when the entry in the forwarding database indicates that the destination network address of the first packet is associated with the downstream port of the other port extender: including in the tag corresponding to the first packet i) a device identifier that identifies the other port extender, and ii) a local port identifier that identifies the downstream port of the other port extender.

The method further includes, when the first packet did not include the tag when the first packet was received by the port extender and when the entry in the forwarding database indicates that the destination network address of the first packet is associated with the downstream port of the other port extender: attaching the tag to the first packet prior to transmitting the first packet via the local downstream port indicated by the forwarding database.

The method further includes: populating the forwarding database with network address/port association information based on source MAC addresses of packets received via the plurality of local downstream ports; and not populating the forwarding database with network address/port association information based on source network addresses of any packets received via the at least one local upstream port.

Receiving packets via the plurality of local downstream ports includes receiving the first packet via a first local downstream port; the first packet includes a tag having an indication of i) another port extender at which the first packet was originally received by the switching system, and ii) a port of the other port extender at which the first packet was originally received by the switching system; and the method further includes: retrieving the indication from the tag, and storing in an entry of the database associated with a network source address (SA) of the first packet, an indication of an association between i) the network SA, ii) an indicator of the first local downstream port via which the first packet was received by the packet extender, and iii) the indication of a) the other port extender at which the first packet was originally received by the switching system, and b) the port of the other port extender at which the first packet was originally received by the switching system.

The forwarding database is populated with entries indicating associations between i) respective media access control (MAC) addresses of devices coupled to local downstream ports of the port extender a) directly or b) via one or more other port extenders downstream from the port extender, and ii) respective local downstream ports of the port extender, wherein the forwarding database excludes entries corresponding to MAC addresses of devices coupled directly, or via another port extender, to the at least one local upstream port of the port extender; and the method further comprises: for the first packet i) received via one of the local downstream ports, and ii) having a destination MAC address in the forwarding database, forwarding the first packet to the different local downstream port indicated by the forwarding database, and for the second packet i) received via one of the local downstream ports, and ii) having a destination MAC address not in the forwarding database, forwarding the second packet to the at least one local upstream port.

The method further includes: processing packets in a first packet processor disposed in the port extender, including performing packet processing functions selected from a first set of packet processing functions that the first packet processor is configured to perform, wherein the first set of packet processing functions consists of a first number of packet processing functions; wherein the controlling switch comprises a second packet processor configured to perform a second set of packet processing functions that consists of a second number of packet processing functions; and the first number is smaller than the second number.

In yet another embodiment, a switching system, comprises: a controlling switch that includes: a plurality of controlling switch ports, and a first packet processor coupled to the controlling switch ports, the first packet processor including a first forwarding engine that includes, or is coupled to, a first forwarding database, wherein the first forwarding engine is configured to forward packets received at any controlling switch port to any other controlling switch port. The system also comprises: a plurality of port extenders, each of at least some of the port extenders including: at least one local upstream port coupled to the controlling switch directly or via another port extender, a plurality of local downstream ports, and a second packet processor coupled to the at least one local upstream port and the plurality of local downstream ports, the second packet processor including a second forwarding engine that includes, or is coupled to, a second forwarding database. The second forwarding engine is configured to forward packets i) received at the downstream ports, and ii) for which the second forwarding database does not include forwarding information, only to the at least one upstream port. The second packet processors have reduced functionality as compared to the first packet processor.

In other embodiments, the switching system comprises one of, or any suitable combination of two or more of, the following features.

The first forwarding database is populated with entries indicating associations between i) respective network addresses of devices coupled to local downstream ports of the plurality of port extenders directly or via one or more other port extenders, and ii) respective controlling switch ports; and each second forwarding database of the at least some of the port extenders is populated with entries indicating associations between i) respective network addresses of devices coupled to local downstream ports of the port extender directly or via one or more other port extenders downstream from the port extender, and ii) respective local downstream ports of the port extender, wherein the second forwarding database excludes entries corresponding to network addresses of devices coupled directly, or via another port extender upstream from the port extender, to the at least one local upstream port of the port extender.

The second forwarding engine is configured to: for packets i) received via the plurality of local downstream ports of the port extender, and ii) having destination network addresses in the second forwarding database, forward the packets to local downstream ports indicated by the second forwarding database; and for packets i) received via the plurality of local downstream ports, and ii) having destination network addresses not in the second forwarding database, forward the packets to the at least one local upstream port.

The second forwarding engine is configured to: populate the second forwarding database with network address/port association information based on source network addresses of packets received via the plurality of local downstream ports; and not populate the forwarding database with network address/port association information based on source network addresses of any packets received via the at least one local upstream port.

The second forwarding database is populated with entries indicating associations between i) respective media access control (MAC) addresses of devices coupled to local downstream ports of the port extender a) directly or b) via one or more other port extenders downstream from the port extender, and ii) respective local downstream ports of the port extender, wherein the second forwarding database excludes entries corresponding to MAC addresses of devices coupled directly, or via another port extender, to the at least one local upstream port of the port extender; and the second forwarding engine is configured to: for the first packet i) received via one of the local downstream ports, and ii) having a destination MAC address in the forwarding database, forward the first packet to the different local downstream port indicated by the forwarding database, and for the second packet i) received via one of the local downstream ports, and ii) having a destination MAC address not in the forwarding database, forward the second packet to the at least one local upstream port.

The first packet processor of the controlling switch includes an Internet Protocol (IP) router configured to forward packets based on IP addresses in packets; and at least some second packet processors of the at least some of the packet extenders are configured to forward packets based on addresses other than IP addresses in packets.

The first packet processor of the controlling switch includes a tunnel termination engine configured to, for packets received at controlling switch ports and that had been transmitted using a tunneling protocol, remove tunneling protocol header fields from the packets, or instructs another component of the first packet processor to remove the tunneling protocol header fields from the packets; and at least some second packet processors of the at least some of the packet extenders are not configured to remove tunneling protocol header fields from packets.

The first packet processor of the controlling switch is configured to perform rate limiting on packets received at controlling switch ports; and at least some second packet processors of the at least some of the packet extenders are not configured to perform rate limiting.

The first packet processor of the controlling switch is configured to classify packets received at controlling switch ports into flows; and at least some second packet processors of the at least some of the packet extenders re not configured to classify packets received at controlling switch ports into flows.

In still another embodiment, a method is implemented in a switching system that includes a controlling switch and a plurality of port extenders that are coupled to the controlling switch. The method includes: receiving packets via a plurality of local downstream ports of the plurality of port extenders; at each of at least some first packet processors disposed in at least some of the port extenders, performing a first set of packet processing functions, including: directing packets received from a port of the controlling switch to ports of the port extender according to forwarding decisions of the controlling switch, and rendering forwarding decisions for first packets received via the plurality of downstream ports to forward selected first packets to other downstream ports of the port extender if the destination addresses of the selected first packets are included in a forwarding database of the first packet processor of the port extender, and to forward selected second packets to a port of the controlling switch if the destination addresses of the selected second packets are not known to the port extender. The method also includes: at a second packet processor disposed in the controlling switch, performing a second set of packet processing functions, including: forwarding packets received at any controlling switch port to any other controlling switch port.

In other embodiments, the method includes one of, or any suitable combination of two or more of, the following features.

The method further includes: at each of the at least some first packet processors, searching a first forwarding database of the at least some of the port extenders populated with entries indicating associations between i) respective network addresses of devices coupled to local downstream ports of the port extender directly or via one or more other port extenders downstream from the port extender, and ii) respective local downstream ports of the port extender, wherein the first forwarding database excludes entries corresponding to network addresses of devices coupled directly, or via another port extender upstream from the port extender, to at least one local upstream port of the port extender that is coupled to at least one port of the controlling switch; and at the second packet processor, searching a second forwarding database populated with entries indicating associations between i) respective network addresses of devices coupled to local downstream ports of the plurality of port extenders directly or via one or more other port extenders, and ii) respective controlling switch ports.

The method further includes: at each of the at least some first packet processors and for packets i) received via the plurality of local downstream ports of the port extender, and ii) having destination network addresses in the first forwarding database, forwarding the packets to local downstream ports indicated by the first forwarding database; and at each of the at least some first packet processors and for packets i) received via the plurality of local downstream ports, and ii) having destination network addresses not in the first forwarding database, forwarding the packets to the at least one local upstream port.

The method further includes: at each of the at least some first packet processors, populating the first forwarding database with network address/port association information based on source network addresses of packets received via the plurality of local downstream ports; and at each of the at least some first packet processors, not populating the forwarding database with network address/port association information based on source network addresses of any packets received via the at least one local upstream port.

The second forwarding database is populated with entries indicating associations between i) respective media access control (MAC) addresses of devices coupled to local downstream ports of the port extender a) directly or b) via one or more other port extenders downstream from the port extender, and ii) respective local downstream ports of the port extender, wherein the second forwarding database excludes entries corresponding to MAC addresses of devices coupled directly, or via another port extender, to the at least one local upstream port of the port extender; and the method further includes: at each of the at least some first packet processors and for a first packet i) received via one of the local downstream ports, and ii) having a destination MAC address in the forwarding database, forwarding the first packet to the different local downstream port indicated by the forwarding database, and at each of the at least some first packet processors and for a second packet i) received via one of the local downstream ports, and ii) having a destination MAC address not in the forwarding database, forwarding the second packet to the at least one local upstream port.

The first set of packet processing operations that at least some of the first packet processors are configured to perform is reduced as compared to the second set of packet processing operations that the second packet processor is configured to perform.

Performing the second set of packet processing functions at the second packet processor of the controlling switch includes forwarding packets based on Internet Protocol (IP) addresses in packets; and performing the first set of packet processing functions at the at least some of the packet extenders based on network addresses other than IP addresses in packets.

Performing the second set of packet processing functions at the second packet processor of the controlling switch includes removing tunneling protocol header fields from packets received at controlling switch ports and that had been transmitted using a tunneling protocol; and the method further comprises, at the at least some first packet processors of the at least some of the packet extenders, forwarding packets, received via downstream ports and for which tunneling protocol header fields are to be removed, to the at least one local upstream port.

Performing the second set of packet processing functions at the second packet processor of the controlling switch comprises performing rate limiting on packets received at controlling switch ports; and performing the second set of packet processing functions at the at least some first packet processors of the at least some of the packet extenders comprises performing the second set of packet processing functions without performing rate limiting.

Performing the second set of packet processing functions at the second packet processor of the controlling switch includes classifying packets received at controlling switch ports into flows; and performing the first set of packet processing functions at the at least some first packet processors of the at least some of the packet extenders, comprises performing the first set of packet processing functions without classifying packets into flows.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts. The one or more processors may be implemented on one or more of i) one or more integrated circuit (IC) devices, ii) one or more application-specific integrated circuits (ASICs), iii) one or more programmable logic devices (PLDs), etc.

When implemented in hardware, the hardware may comprise a plurality of transistors (and other circuit components such as capacitors) arranged and coupled together as circuitry that is configured to perform various acts. The circuitry may be implemented on one or more of i) one or more of discrete components, ii) one or more IC devices, iii) one or more ASICs, iv) one or more PLDs, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A port extender for use in a switching system comprising a controlling switch and one or more other port extenders, the port extender comprising:
   at least one local upstream port coupled to the controlling switch directly or via another port extender;
   a plurality of local downstream ports; and
   a packet processor coupled to the at least one local upstream port and the plurality of local downstream ports, the packet processor including, or being coupled to, a forwarding database that is populated with entries indicating associations between i) respective network addresses corresponding to devices coupled to local downstream ports of the port extender a) directly or b) via one or more other port extenders downstream from the port extender, and ii) respective local downstream ports of the port extender, wherein the forwarding database excludes entries corresponding to network addresses corresponding to devices coupled directly, or via another port extender upstream from the port extender, to the at least one local upstream port of the port extender, wherein the packet processor is configured to:
      for at least some network address/port associations in the forwarding database,
         determine whether a particular packet was received i) via a port that is one of the local downlink ports of the port extender or ii) via the at least one uplink port of the port extender, and
      when it is determined, at the port extender, that the particular packet was received via a port that is one of the local downstream ports of the port extender and not via the at least one uplink port of the port extender, a) learn a first association between i) a network address associated with the particular packet and ii) the corresponding local downstream port at which the particular packet was received at the port extender and b) if the particular packet was received by the port extender from another port extender among the one or more other port extenders downstream from the port extender, additionally learn at least a second association between i) the network address associated with the particular packet and ii) a port at which the particular packet was first received by the switching system, and for a first packet i) received via one of the local downstream ports, and ii) having a destination network address in the forwarding database, forward the first packet to a different local downstream port indicated by the forwarding database, and for a second packet i) received via one of the local downstream ports, and ii) having a destination network address not in the forwarding database, forward the second packet to the at least one local upstream port.

2. The port extender of claim 1, wherein:

the forwarding database is populated by entries that further indicate associations between i) respective network addresses of devices coupled to downstream ports of the port extender via one or more other port extenders downstream from the port extender, and ii) respective ports of one or more other port extenders, downstream from the port extender, to which the devices are coupled; and the packet processor is configured to, when an entry in the forwarding database indicates that a destination network address of the first packet is associated with a downstream port of another port extender, include in a tag corresponding to the first packet an indication of i) the other port extender, and ii) the downstream port of the other port extender.

3. The port extender of claim 2, wherein the packet processor is configured to, when the entry in the forwarding database indicates that the destination network address of the first packet is associated with the downstream port of the other port extender:

include in the tag corresponding to the first packet a global port identifier that identifies i) the other port extender, and ii) the downstream port of the other port extender.

4. The port extender of claim 2, wherein the packet processor is configured to, when the entry in the forwarding database indicates that the destination network address of the first packet is associated with the downstream port of the other port extender:

include in the tag corresponding to the first packet i) a device identifier that identifies the other port extender, and ii) a local port identifier that identifies the downstream port of the other port extender.

5. The port extender of claim 2, wherein the packet processor is configured to, when the first packet did not include the tag when the first packet was received by the port extender and when the entry in the forwarding database indicates that the destination network address of the first packet is associated with the downstream port of the other port extender:

attach the tag to the first packet prior to transmitting the first packet via the local downstream port indicated by the forwarding database.

6. The port extender of claim 1, wherein the packet processor is configured to:

populate the forwarding database with network address/port association information based on source network addresses of packets received via the plurality of local downstream ports; and not populate the forwarding database with network address/port association information based on source network addresses of any packets received via the at least one local upstream port.

7. The port extender of claim 6, wherein:

the first packet is received via a local downstream port;

the first packet includes a tag having an indication of i) another port extender at which the first packet was originally received by the switching system, and ii) a port of the other port extender at which the first packet was originally received by the switching system; and the packet processor is configured to:

retrieve the indication from the tag, and store in an entry of the database associated with a network source address (SA) of the first packet, an indication of an association between i) the network SA, ii) an indicator of the local downstream port via which the first packet was received by the port extender, and iii) the indication of a) the other port extender at which the first packet was originally received by the switching system, and b) the port of the other port extender at which the first packet was originally received by the switching system.

8. The port extender of claim 1, wherein:

the forwarding database is populated with entries indicating associations between i) respective media access control (MAC) addresses of devices coupled to local downstream ports of the port extender a) directly or b) via one or more other port extenders downstream from the port extender, and ii) respective local downstream ports of the port extender, wherein the forwarding database excludes entries corresponding to MAC addresses of devices coupled directly, or via another port extender, to the at least one local upstream port of the port extender; and the packet processor is configured to:

for the first packet i) received via one of the local downstream ports, and ii) having a destination MAC address in the forwarding database, forward the first packet to the different local downstream port indicated by the forwarding database, and for the second packet i) received via one of the local downstream ports, and ii) having a destination MAC address not in the forwarding database, forward the second packet to the at least one local upstream port.

9. The port extender of claim 1, wherein:

the packet processor is a first packet processor disposed in the port extender;

the first packet processor comprises a first pipeline with a first number of pipeline elements;

the controlling switch comprises a second packet processor having a second pipeline with a second number of pipeline elements; and the first number of pipeline elements is less than the second number of pipeline elements.

10. A method implemented in a port extender in a switching system that includes a controlling switch and one or more other port extenders, the method comprising:

receiving packets via at least one local upstream port of the port extender, the at least one upstream port being coupled to the controlling switch directly or via an intermediate port extender;

receiving packets via a plurality of local downstream ports of the port extender;

for packets received via the plurality of downstream ports, search a forwarding database that is populated with entries indicating associations between i) respective network addresses corresponding to devices coupled to local downstream ports of the port extender a) directly or b) via one or more other port extenders downstream from the port extender, and ii) respective local downstream ports of the port extender, wherein the forwarding database excludes entries corresponding to network addresses corresponding to devices coupled directly, or via another port extender upstream from the port extender, to the at least one local upstream port of the port extender;

maintaining the forwarding database at the port extender, including for at least some network address/port associations in the forwarding database, determining, at the port extender, whether a particular packet was received i) via a port that is one of the local downstream ports of the port extender or ii) via the at least one uplink port of the port extender, and based on determining, at the port extender, that the particular packet was received via a port that is one of the local downstream ports of the port extender and not via the at least one uplink port of the port extender, a) learning a first association between i) a network address associated with the particular packet and ii) the corresponding local downstream port at which the particular packet was received at the port extender and b) if the particular packet was received by the port extender from another port extender among the one or more other port extenders downstream from the port extender, additionally learning at least a second association between i) the network address associated with the particular packet and ii) a port at which the particular packet was first received by the switching system;

for a first packet i) received via one of the local downstream ports, and ii) having a destination network address in the forwarding database, forwarding the first packet to a different local downstream port indicated by the forwarding database; and for a second packet i) received via one of the local downstream ports, and ii) having destination network addresses not in the forwarding database, forwarding the second packet to the at least one local upstream port.

11. The method of claim 10, wherein:

the forwarding database is populated by entries that further indicate associations between i) respective network addresses corresponding to devices coupled to downstream ports of the port extender via one or more other port extenders downstream from the port extender, and ii) respective ports of one or more other port extenders, downstream from the port extender, to which the devices are coupled; and the method further comprises, when an entry in the forwarding database indicates that a destination network address of the first packet is associated with a downstream port of another port extender, including in a tag corresponding to the first packet an indication of i) the other port extender, and ii) the downstream port of the other port extender.

12. The method of claim 11, further comprising, when the entry in the forwarding database indicates that the destination network address of the first packet is associated with the downstream port of the other port extender:

including in the tag corresponding to the first packet a global port identifier that identifies i) the other port extender, and ii) the downstream port of the other port extender.

13. The method of claim 11, further comprising, when the entry in the forwarding database indicates that the destination network address of the first packet is associated with the downstream port of the other port extender:

including in the tag corresponding to the first packet i) a device identifier that identifies the other port extender, and ii) a local port identifier that identifies the downstream port of the other port extender.

14. The method of claim 11, further comprising, when the first packet did not include the tag when the first packet was received by the port extender and when the entry in the forwarding database indicates that the destination network address of the first packet is associated with the downstream port of the other port extender:

attaching the tag to the first packet prior to transmitting the first packet via the local downstream port indicated by the forwarding database.

15. The method of claim 10, further comprising:

populating the forwarding database with network address/port association information based on source MAC addresses of packets received via the plurality of local downstream ports; and not populating the forwarding database with network address/port association information based on source network addresses of any packets received via the at least one local upstream port.

16. The method of claim 15, wherein:

receiving packets via the plurality of local downstream ports includes receiving the first packet via a first local downstream port;

the first packet includes a tag having an indication of i) another port extender at which the first packet was originally received by the switching system, and ii) a port of the other port extender at which the first packet was originally received by the switching system; and the method further comprises:

retrieving the indication from the tag, and storing in an entry of the database associated with a network source address (SA) of the first packet, an indication of an association between i) the network SA, ii) an indicator of the first local downstream port via which the first packet was received by the port extender, and iii) the indication of a) the other port extender at which the first packet was originally received by the switching system, and b) the port of the other port extender at which the first packet was originally received by the switching system.

17. The method of claim 10, wherein:

the forwarding database is populated with entries indicating associations between i) respective media access control (MAC) addresses of devices coupled to local downstream ports of the port extender a) directly or b) via one or more other port extenders downstream from the port extender, and ii) respective local downstream ports of the port extender, wherein the forwarding database excludes entries corresponding to MAC addresses of devices coupled directly, or via another port extender, to the at least one local upstream port of the port extender; and the method further comprises:

for the first packet i) received via one of the local downstream ports, and ii) having a destination MAC address in the forwarding database, forwarding the first packet to the different local downstream port indicated by the forwarding database, and for the second packet i) received via one of the local downstream ports, and ii) having a destination MAC address not in the forwarding database, forwarding the second packet to the at least one local upstream port.

18. The method of claim 10, further comprising:
processing packets in a first packet processor disposed in the port extender, including performing packet processing functions selected from a first set of packet processing functions that the first packet processor is configured to perform, wherein the first set of packet processing functions consists of a first number of packet processing functions;
wherein the controlling switch comprises a second packet processor configured to perform a second set of packet processing functions that consists of a second number of packet processing functions; and
the first number is smaller than the second number.

19. The port extender of claim 1, wherein the packet processor is configured to
based on determining, at the port extender, that a third packet was received via a port that is one of the local downstream ports of the port extender and not via the at least one uplink port of the port extender,
record, in the forwarding database, an association between i) a source network address associated with the third packet and ii) the corresponding local downstream port at which the third packet was received, and
when the forwarding database includes an association between i) a destination network address associated with the third packet and ii) a different local downstream port of the port extender, forward the third packet to the different local downstream port of the port extender, without forwarding the third packet to the at least one upstream port of the port extender, and
based on determining, at the port extender, that a fourth packet was received via the at least one upstream port of the port extender, not record, in the forwarding database, an association between i) a source network address associated with the fourth packet and ii) the corresponding upstream port at which the fourth packet was received.

20. The port extender of claim 1, wherein the packet processor is configured to maintain the forwarding database at the port extender to indicate associations between i) respective network addresses corresponding to devices coupled to local downstream ports of the port extender a) directly or b) via one or more other port extenders downstream from the port extender and ii) respective local downstream ports of the port extender, without maintaining the forwarding database to indicate associations between network addresses for ports of other port extenders coupled to the controlling switch.

21. The method of claim 10, wherein
maintaining the forwarding database at the port extender includes
based on determining, at the port extender, that a third packet was received via a port that is one of the local downstream ports of the port extender and not via the at least one uplink port of the port extender, recording, in the forwarding database, an association between i) a source network address associated with the third packet and ii) the corresponding local downstream port at which the third packet was received, and
based on determining, at the port extender, that a fourth packet was received via the at least one upstream port of the port extender, not recording, in the forwarding database, an association between i) a source network address associated with the fourth packet and ii) the corresponding upstream port at which the fourth packet was received, and
the method further comprises when the forwarding database includes an association between i) a destination network address associated with the third packet and ii) a different local downstream port of the port extender, forwarding the third packet to the different local downstream port of the port extender, without forwarding the third packet to the at least one upstream port of the port extender.

22. The method of claim 10, wherein maintaining the forwarding database at the port extender includes maintaining the forwarding database to indicate associations between i) respective network addresses corresponding to devices coupled to local downstream ports of the port extender a) directly or b) via one or more other port extenders downstream from the port extender and ii) respective local downstream ports of the port extender, without maintaining the forwarding database to indicate associations between network addresses for ports of other port extenders coupled to the controlling switch.

* * * * *